(12) United States Patent
Hashimoto et al.

(10) Patent No.: US 10,699,579 B2
(45) Date of Patent: Jun. 30, 2020

(54) AUTONOMOUS DRIVING SYSTEM AND AUTONOMOUS DRIVING VEHICLE

(71) Applicant: Toyota Jidosha Kabushiki Kaisha, Toyota-shi, Aichi-ken (JP)

(72) Inventors: Ryuta Hashimoto, Susono (JP);
Yoshinori Watanabe, Gotenba (JP);
Kenichiro Aoki, Miyoshi (JP);
Tomoyuki Kuriyama, Hadano (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 279 days.

(21) Appl. No.: 15/644,136

(22) Filed: Jul. 7, 2017

(65) Prior Publication Data
US 2018/0047292 A1   Feb. 15, 2018

(30) Foreign Application Priority Data

Aug. 10, 2016   (JP) .................. 2016-157600

(51) Int. Cl.
| | | |
|---|---|---|
| *B60W 30/00* | (2006.01) | |
| *G08G 1/16* | (2006.01) | |
| *G01C 21/36* | (2006.01) | |
| *G06K 9/00* | (2006.01) | |
| *G05D 1/02* | (2020.01) | |
| *G08G 1/01* | (2006.01) | |

(52) U.S. Cl.
CPC ............. *G08G 1/167* (2013.01); *B60W 30/00* (2013.01); *G01C 21/3658* (2013.01); *G05D 1/0289* (2013.01); *G06K 9/00798* (2013.01); *G08G 1/0125* (2013.01); *G05D 2201/0213* (2013.01)

(58) Field of Classification Search
CPC ..... G08G 1/167; G08G 1/0125; B60W 30/00; G01C 21/3658; G05D 1/0289; G05D 2201/0213; G06K 9/00798
USPC .................... 701/118, 23, 24, 400
See application file for complete search history.

(56) References Cited

U.S. PATENT DOCUMENTS

| | | | |
|---|---|---|---|
| 9,672,734 B1* | 6/2017 | Ratnasingam ....... G08G 1/0145 |
| 2001/0013837 A1 | 8/2001 | Yamashita et al. |
| 2004/0090117 A1 | 5/2004 | Dudeck et al. |
| 2009/0012703 A1 | 1/2009 | Aso et al. |
| 2012/0123660 A1* | 5/2012 | Kagawa ................. G08G 1/164 701/96 |
| 2014/0188376 A1* | 7/2014 | Gordon .................... G08G 1/09 701/118 |

(Continued)

FOREIGN PATENT DOCUMENTS

| | | | |
|---|---|---|---|
| CN | 105631793 A | 6/2016 |
| JP | H11283176 A | 10/1999 |

(Continued)

*Primary Examiner* — Thomas G Black
*Assistant Examiner* — Wae L Louie
(74) *Attorney, Agent, or Firm* — Dinsmore & Shohl LLP

(57) ABSTRACT

An autonomous driving vehicle sets a travelable area in which the autonomous driving vehicle can travel in a process of going to a destination. In a multiple-lane area including two or more lanes in the travelable area, one lane is determined as a standard travel lane. Processing of determining the standard travel lane is configured so that dispersion occurs to standard travel lanes which are determined by a plurality of autonomous driving vehicles in a same multiple-lane area placed under a same environment.

22 Claims, 22 Drawing Sheets

(56) References Cited

U.S. PATENT DOCUMENTS

| | | | |
|---|---|---|---|
| 2014/0267734 A1* | 9/2014 | Hart, Jr. | G08G 1/07 348/149 |
| 2014/0278052 A1* | 9/2014 | Slavin | G01C 21/3492 701/400 |
| 2015/0370255 A1* | 12/2015 | Harvey | B62D 15/0285 701/24 |
| 2016/0171894 A1* | 6/2016 | Harvey | G05D 1/0088 701/23 |
| 2016/0231746 A1* | 8/2016 | Hazelton | G01S 13/867 |
| 2016/0379064 A1* | 12/2016 | van Beek | G06K 9/00798 382/104 |
| 2017/0050638 A1* | 2/2017 | Gordon | B60W 30/16 |
| 2017/0082452 A1* | 3/2017 | Sumizawa | G01C 21/3658 |
| 2017/0192437 A1* | 7/2017 | Bier | G01C 21/28 |
| 2018/0004223 A1* | 1/2018 | Baldwin | B60W 30/18154 |
| 2018/0043935 A1* | 2/2018 | Hashimoto | G08G 1/163 |
| 2018/0047292 A1* | 2/2018 | Hashimoto | G08G 1/167 |
| 2018/0089563 A1* | 3/2018 | Redding | G05D 1/0088 |
| 2018/0090001 A1* | 3/2018 | Fletcher | B60W 20/12 |

FOREIGN PATENT DOCUMENTS

| | | |
|---|---|---|
| JP | 2001227970 A | 8/2001 |
| JP | 2004-504216 | 2/2004 |
| JP | 2006098232 A | 4/2006 |
| JP | 2008262418 A | 10/2008 |
| WO | 2007/102405 A1 | 9/2007 |
| WO | 2015190212 A1 | 12/2015 |

* cited by examiner

Fig. 2
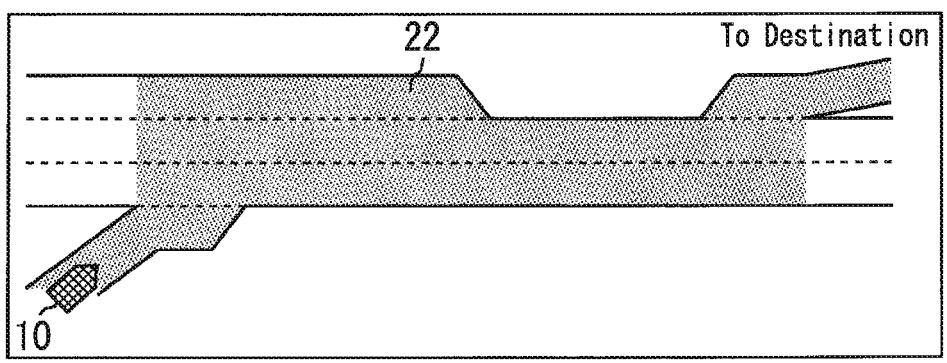
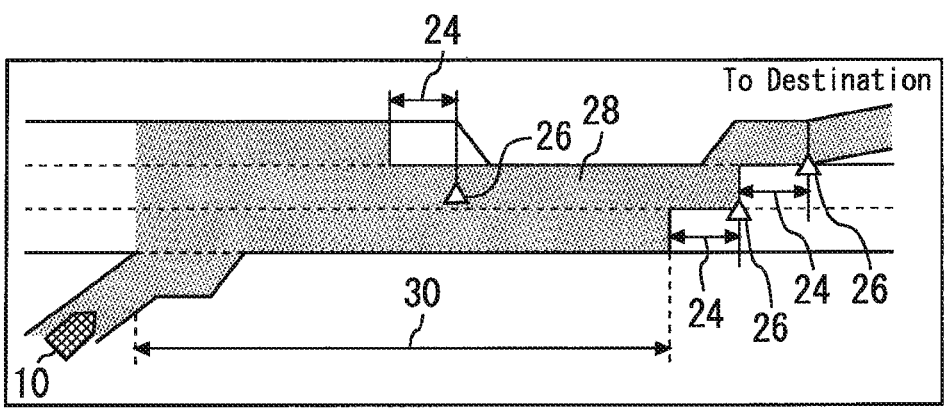
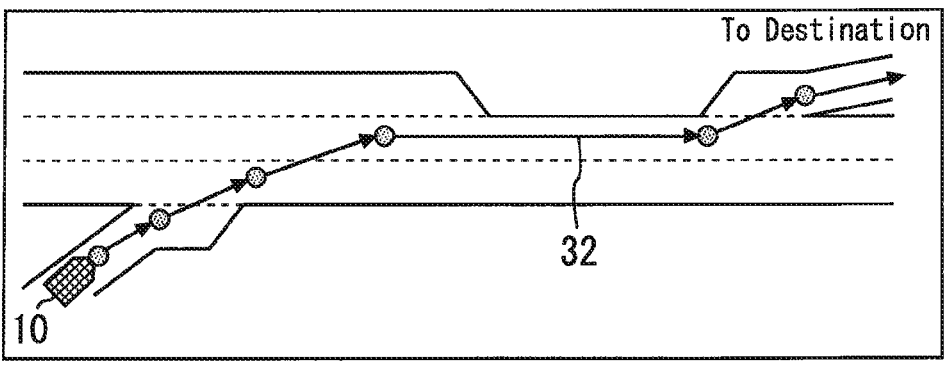

AUTONOMOUS DRIVING SYSTEM AND AUTONOMOUS DRIVING VEHICLE

CROSS-REFERENCE TO RELATED APPLICATIONS

This application claims priority to Japanese Patent Application No. 2016-157600 filed Aug. 10, 2016 which is incorporated herein by reference in its entirety include the specification, drawings, and abstract.

BACKGROUND

Technical Field

Embodiments of the present disclosure relates to an autonomous driving system and an autonomous driving vehicle. More particularly, embodiments of the present disclosure relate to an autonomous driving system that is realized by a plurality of autonomous driving vehicles, and an autonomous driving vehicle suitable as a component of the system.

Background Art

International Publication No. WO 2007/102405 discloses a vehicle path determining method that can be used in paths self-determination in an autonomous driving vehicle. In this method, paths of the vehicle, other vehicles and the likes are predicted first. Next, a plurality of path candidates with high safety are selected based on a probability of an interference between the vehicle and the other vehicles or the likes. Subsequently, traveling efficiencies are compared for the respective plurality of candidates. As for the traveling efficiency, a time period and a fuel consumption amount to arrival at a destination are adopted as evaluation items. Finally, the path with the highest traveling efficiency among the path candidates with high safety is selected as a vehicle path.

LIST OF RELATED ART

Following is a list of a patent literature which the applicant has noticed as a related art of the present disclosure.
Patent Literature 1: International Publication No. WO 2007/102405

Problem to be Solved by Embodiments of the Present Disclosure

According to the path determining method described in WO 2007/102405 described above, the path suitable for arriving at a destination safely in a short time can be selected as the vehicle path. Consequently, according to the method, convenience of an autonomous driving vehicle can be enhanced.

However, when the path determining method is equally mounted on a large number of autonomous driving vehicles, the large number of vehicles make the same decision under the same environment, and a maldistribution easily occurs to a traffic flow. More specifically, there arises a situation in which a number of autonomous driving vehicles equally want lane change in the same spot, and as a result, there can arise the situation in which the flow of traffic is hindered.

Embodiments of the present disclosure have been made to solve the problem as described above, and has a first object to provide an autonomous driving system that does not cause a local overconcentration in a traffic flow including a number of autonomous driving vehicles having functions of determining paths.

Further, embodiments of the present disclosure have a second object to provide an autonomous driving vehicle that has the function of determining a path, and does not cause a local overconcentration in traffic even when autonomously traveling in a traffic flow where a number of autonomous driving vehicles participate.

SUMMARY

To achieve the above mentioned purpose, a first aspect of an embodiment of the present disclosure is an autonomous driving system including a plurality of autonomous driving vehicles, wherein each of the autonomous driving vehicles comprises: a control device that sets a travelable area in which the autonomous driving vehicle can travel in a process of going to a destination, and determines one lane as a standard travel lane in a multiple-lane area including two or more lanes in the travelable area, and the control devices installed in the individual autonomous driving vehicles are configured so that dispersion occurs to the standard travel lanes which the plurality of autonomous driving vehicles determine in a same multiple-lane area placed under a same environment.

A second aspect of an embodiment of the present disclosure is the autonomous driving system according to the first aspect discussed above, wherein the control device executes: processing of generating random numbers, processing of reading lane threshold values, and lane determination processing of determining the standard travel lane based on comparison of the random numbers and the lane threshold values.

A third aspect of an embodiment of the present disclosure is the autonomous driving system according to the second aspect discussed above, wherein the lane determination processing comprises: processing of determining a temporary travel lane in the multiple-lane area based on information concerning travel of the vehicle, and processing of determining whether to set the temporary travel lane as the standard travel lane, or to set a lane different from the temporary travel lane as the standard travel lane, based on comparison of the random numbers and the lane threshold values.

A fourth aspect of an embodiment of the present disclosure is the autonomous driving system according to the second or the third aspect discussed above, wherein the control device executes: processing of setting vehicle distribution targets in the multiple-lane area, and processing of setting the lane threshold values in correspondence with the distribution targets.

A fifth aspect of an embodiment of the present disclosure is the autonomous driving system according to the first aspect discussed above, wherein the control device stores a lane characteristic value, and determines the standard travel lane based on the lane characteristic value, and lane characteristic values stored in the respective plurality of autonomous driving vehicles have dispersion.

A sixth aspect of and embodiment of the present disclosure is the autonomous driving system according to the fifth aspect discussed above, wherein the control device executes: processing of generating random numbers, threshold value setting processing of setting lane threshold values based on the lane characteristic value, and processing of determining the standard travel lane based on comparison of the random numbers and the lane threshold values.

A seventh aspect of an embodiment of the present disclosure is the autonomous driving system according to the sixth aspect discussed above, wherein the control device executes: processing of setting vehicle distribution targets in the multiple-lane area, and processing of setting such a relation between the lane characteristic value and the lane threshold value that the distribution targets are realized when the lane characteristic value is dispersed in an entire range of a variation region, and setting the lane threshold values by applying a lane characteristic value of an own vehicle to the relation, in the threshold value setting processing.

A eighth aspect of an embodiment of the present disclosure is the autonomous driving system according to the fifth aspect discussed above, wherein the control device executes: threshold value setting processing of setting lane threshold values that are used in common in the plurality of autonomous driving vehicles, and processing of determining the standard travel lane based on comparison of the lane threshold values and the lane characteristic value.

A ninth aspect of an embodiment of the present disclosure is the autonomous driving system according to the eighth aspect discussed above, wherein the control device executes processing of setting vehicle distribution targets in the multiple-lane area, and the threshold value setting processing includes processing of setting the lane threshold values in correspondence with the distribution targets.

A tenth aspect of and embodiment of the present disclosure is the autonomous driving system according to the fifth to ninth aspects discussed above, wherein the control device executes: processing of detecting a characteristic concerning lane selection of a driver of a vehicle, and processing of reflecting the characteristic in the lane characteristic value.

An eleventh aspect of an embodiment of the present disclosure is the autonomous driving system according to any one of the fourth, seventh and ninth aspects discussed above, wherein the control device executes: processing of acquiring real vehicle distribution in the multiple-lane area, and processing of correcting the lane threshold values so that the real vehicle distribution approaches the distribution targets.

A twelfth aspect of an embodiment of the present disclosure is the autonomous driving system according to any one of the fourth, seventh, ninth and eleventh aspects discussed above, wherein the control device executes: processing of extracting a change point where the distribution targets change on a route to the destination, processing of setting one section in a multiple-lane area including the change point as a gradual changing area, and processing of gradually changing the distribution targets in the gradual changing area from a distribution before the change to a distribution after the change.

A thirteenth aspect of an embodiment of the present disclosure is the autonomous driving system according to any one of the first to twelfth aspects discussed above, wherein the control device executes: processing of detecting an no-change recommendation phenomenon in which keep of a lane is recommended, and processing of determining the standard travel lane in a mode that causes the plurality of autonomous driving vehicles placed under a same environment to make a same decision when the no-change recommendation phenomenon is detected.

A fourteenth aspect of and embodiment of the present disclosure is an autonomous driving vehicle having a function of performing autonomous travel toward a destination, comprising: a control device that sets a travelable area in which the autonomous driving vehicle can travel in a process of going to the destination, and determines one lane as a standard travel lane in a multiple-lane area including two or more lanes in the travelable area, wherein the control device is configured so that dispersion occurs to the standard travel lane that is determined in a same multiple-lane area placed under a same environment.

A fifteenth aspect of an embodiment of the present disclosure is the autonomous driving vehicle according to the fourteenth aspect discussed above, wherein the control device executes: processing of generating random numbers, processing of reading lane threshold values, and lane determination processing of determining the standard travel lane based on comparison of the random numbers and the lane threshold values.

A sixteenth aspect of an embodiment of the present disclosure is the autonomous driving vehicle according to the fifteenth aspect discussed above, wherein the lane determination processing comprises: processing of determining a temporary travel lane in the multiple-lane area based on information concerning travel of the vehicle, and processing of determining whether to set the temporary travel lane as the standard travel lane, or to set a lane different from the temporary travel lane as the standard travel lane, based on comparison of the random numbers and the lane threshold values.

A seventeenth aspect of an embodiment of the present disclosure is the autonomous driving vehicle according to the fifteenth or sixteenth aspect discussed above, wherein the control device executes: processing of setting vehicle distribution targets in the multiple-lane area, and processing of setting the lane threshold values in correspondence with the distribution targets.

An eighteenth aspect of and embodiment of the present disclosure is an autonomous driving vehicle having a function of performing autonomous travel toward a destination, comprising: a control device that sets a travelable area in which the autonomous driving vehicle can travel in a process of going to the destination, and determines one lane as a standard travel lane in a multiple-lane area including two or more lanes in the travelable area, wherein the control device is configured so that a probability of each of individual lanes being determined as the standard travel lane in a same multiple-lane area placed under a same environment becomes a fixed value except for 100% for each of the lanes.

A nineteenth aspect of an embodiment of the present disclosure is the autonomous driving vehicle according to the eighteenth aspect discussed above, wherein the control device stores a lane characteristic value, and executes: processing of generating random numbers, threshold value setting processing of setting lane threshold values based on the lane characteristic value, and processing of determining the standard travel lane based on comparison of the random numbers and the lane threshold values.

A twentieth aspect of and embodiment of the present disclosure is the autonomous driving vehicle according to the nineteenth aspect discussed above, wherein the control device executes: processing of setting vehicle distribution targets in the multiple-lane area, and processing of setting such a relation between the lane characteristic value and the lane threshold values that the distribution targets are realized when the lane characteristic value disperses in an entire range of a variation region, and sets the lane threshold values by applying a lane characteristic value of a vehicle to the relation, in the threshold value setting processing.

A twenty first aspect of an embodiment of the present disclosure is the autonomous driving vehicle according to the eighteenth aspect discussed above, wherein the control device stores a lane characteristic value, and executes: threshold value setting processing of setting lane threshold values corresponding to the respective lanes of the multiple-lane area, and processing of determining the standard travel lane based on comparison of the lane threshold values and the lane characteristic value.

A twenty second aspect of an embodiment of the present disclosure is the autonomous driving vehicle according to the twenty first aspect discussed above, wherein the control device executes processing of setting vehicle distribution targets in the multiple-lane area, and the threshold value setting processing includes processing of setting the lane threshold value in correspondence with the distribution targets.

A twenty third aspect of an embodiment of the present disclosure is the autonomous driving vehicle according to any one of the nineteenth to twenty second aspects discussed above, wherein the control device executes: processing of detecting a characteristic concerning lane selection of a driver of an own vehicle, and processing of reflecting the characteristic in the lane characteristic value.

A twenty fourth aspect of and embodiment of the present disclosure is the autonomous driving system according to any one of the seventeenth, twentieth, and twenty second aspects discussed above, wherein the control device executes: processing of acquiring real vehicle distribution in the multiple-lane area, and processing of correcting the lane threshold values so that the real vehicle distribution approaches the distribution targets.

A twenty fifth aspect of an embodiment of the present disclosure is the autonomous driving vehicle according to any one of the seventeenth, twentieth, twenty second and twenty fourth aspects discussed above, wherein the control device executes: processing of extracting a change point where the distribution targets change on a route to the destination, processing of setting one section in a multiple-lane area including the change point as a gradual changing area, and processing of gradually changing the distribution targets in the gradual changing area from a distribution before the change to a distribution after the change.

A twenty sixth aspect of an embodiment of the present disclosure is the autonomous driving vehicle according to any one of the fourteenth to twenty fifth aspects discussed above, wherein the control device executes: processing of detecting an no-change recommendation phenomenon in which keep of a lane is recommended, and processing of determining the standard travel lane in a mode in which same decision is made under a same environment when the no-change recommendation phenomenon is detected.

Advantages of Embodiments of the Present Disclosure

According to the first aspect discussed above, the autonomous driving vehicle selects the standard travel lane in the multiple-lane area. The standard travel lanes which are selected by the individual autonomous driving vehicles have dispersion in the entire system. Consequently, according to the present aspect, the standard travel lanes can be prevented from concentrating on only a specific lane.

According to the second aspect discussed above, the standard travel lanes of the individual autonomous driving vehicles are distributed to the respective lanes in the multiple-lane area with probabilities corresponding to the lane threshold values. When the individual autonomous driving vehicles determine the standard travel lanes in this way, the standard travel lanes are dispersed to the respective one of the plurality of lanes with the probabilities corresponding to the lane threshold values, in the entire system.

According to the third aspect discussed above, the standard travel lane is determined to be the temporary travel lane or the lane other than the temporary travel lane with the probabilities corresponding to the lane threshold values. When the individual autonomous driving vehicles determine the standard travel lanes in this way, dispersion can be caused in the standard travel lanes in the entire system.

According to the fourth aspect discussed above, the lane threshold values are set in accordance with the vehicle distribution targets. Here, the lane threshold values determine the probabilities of the standard travel lanes being dispersed to the respective lanes in the entire system. Consequently, according to the present aspect, the distribution of the standard travel lanes can be matched with the vehicle distribution targets in the entire system.

In the fifth aspect discussed above, the lane characteristic values have dispersion in the entire system. The autonomous driving vehicles being different in lane characteristic values are apt to determine different standard travel lanes. Consequently, according to the present aspect, dispersion can be caused in the standard travel lanes in the entire system.

According to the sixth aspect discussed above, the autonomous driving vehicle determines the standard travel lane by comparing the lane threshold values and the random numbers. In this case, the standard travel lanes which are determined in the individual autonomous driving vehicles show dispersion with the probabilities corresponding to the lane threshold values. Further, in the present aspect, the lane threshold values are set based on the lane characteristic values. Dispersion is given to the lane characteristic values, and therefore, the lane threshold values show dispersion in the entire system. Consequently, according to the present aspect, the standard travel lanes can be dispersed in the entire system.

According to the seventh aspect discussed above, a relation between the lane characteristic value and the lane threshold values is set. According to the relation, the vehicle distribution targets is realized in a case where the lane characteristic values disperse in the entire range of the variation region. The dispersion of the lane characteristic values in the entire system tends to spread to the entire range of the variation region as the number of autonomous driving vehicles increases. Consequently, according to the present aspect, the distribution of the standard travel lanes can be brought closer to the distribution targets as the number of autonomous driving vehicles increases.

According to the eighth aspect discussed above, the standard travel lane is determined based on comparison of the lane threshold values and the lane characteristic value. In the present aspect, the lane threshold values are common in the entire system, whereas dispersion is given to the lane characteristic values. Consequently, according to the present aspect, dispersion can be given to the standard travel lanes in the entire system.

According to the ninth aspect discussed above, the lane threshold values which are used in common in the entire system are set in correspondence with the vehicle distribution targets. The distribution of the standard travel lanes in the entire system changes in correspondence with the lane threshold values. Consequently, when the lane threshold values are set in correspondence with the distribution target, distribution of the standard travel lanes can be matched with the vehicle distribution target in the entire system.

According to the tenth aspect discussed above, the characteristics concerning lane selection of the drivers are reflected in the lane characteristic values. The standard travel lanes are set in accordance with the lane characteristic values. Consequently, according to the present aspect, the standard travel lanes which are set during autonomous driving can be made in line with the characteristics of the drivers.

According to the eleventh aspect discussed above, the lane threshold values can be corrected so that the real vehicle distribution approaches the distribution targets. In the autonomous driving vehicle in which the lane threshold values are corrected, the standard travel lane is determined so that the real vehicle distribution approaches the distribution targets. Consequently, according to the present aspect, the real vehicle distribution can be brought close to the distribution targets in the entire system.

According to the twelfth aspect discussed above, the gradual changing area is set in the section including the change point of the distribution targets, and in the gradual changing area, the distribution targets can be gradually changed. If there is no setting of the gradual changing area, a plurality of autonomous driving vehicles perform lane change simultaneously before and after the change point. According to the present aspect, concentration of lane changes like this can be avoided.

According to the thirteenth aspect discussed above, under the situation where keep of the lane is recommended, the standard travel lanes can be determined in the mode that does not cause dispersion. During travel of vehicles, the vehicles may encounter the situation where lane change to a specific lane is unsuitable, such as passage of an emergency vehicle, and lane restrictions due to construction. According to the present aspect, some of the autonomous driving vehicles can be prevented from performing lane change to the unsuitable lane, under the situation like this.

According to the fourteenth aspect discussed above, the autonomous driving vehicles select the standard travel lanes with dispersion in the same multiple-lane area placed under the same environment. When a number of autonomous driving vehicles travel under the same environment, the individual vehicles select the standard travel lanes with dispersion, and therefore, the vehicles do not concentrate on only a specific lane. Consequently, according to the present aspect, an imbalance can be prevented from occurring to the traffic flow.

According to the fifteenth aspect discussed above, the standard travel lanes of the individual autonomous driving vehicles are distributed to respective lanes of the multiple-lane area with the probabilities corresponding to the lane threshold values. When the individual autonomous driving vehicles determine the standard travel lanes in this way, the standard travel lanes are dispersed to the respective one of the plurality of lanes with the probabilities corresponding to the lane threshold values, in the entire system composed of a plurality of autonomous driving vehicles.

According to the sixteenth aspect discussed above, the temporary travel lane or the lane other than the temporary travel lane is determined to be the standard travel lane, with the probabilities corresponding to the lane threshold values. When the individual autonomous driving vehicles determine the standard travel lanes in this way, the standard travel lanes have dispersion in the entire system including a number of autonomous driving vehicles.

According to the seventeenth aspect discussed above, the lane threshold values are set in accordance with the vehicle distribution targets. Here, the lane threshold values determine the probabilities with which the standard travel lanes of the individual vehicles disperse to the respective lanes, when a number of autonomous driving vehicles are present. Consequently, according to the present aspect, in the case of a number of autonomous driving vehicles gathering together, the distribution of the standard travel lanes can be matched with the vehicle distribution target.

According to the eighteenth aspect discussed above, the autonomous driving vehicles select the travel lane or the passing lane as the standard travel lanes with certain probabilities respectively, in the multiple-lane area. Since the individual characters concerning lane selection of an autonomous driving vehicle is consistent, a driver can easily accepts the result of the selection. Further, dispersion is given to the individual characters of the individual autonomous driving vehicles, whereby an imbalance in the traffic flow can be prevented.

According to the nineteenth aspect discussed above, the autonomous driving vehicle determines the standard travel lane by comparing the lane threshold values and the random numbers. In this case, the standard travel lanes which are determined in the individual autonomous driving vehicles show dispersion with the probabilities corresponding to the lane threshold values. If the standard travel lanes are determined in this way in the individual autonomous driving vehicles, in the case of a number of autonomous driving vehicles gathering together, the standard travel lanes of these vehicles can be properly dispersed. Further, in the present aspect, dispersion can be also given to the lane threshold values, if dispersion is given to the lane characteristic values. Consequently, according to the present aspect, it is possible to disperse the standard travel lanes minutely by giving lane characteristic values having dispersion to a number of autonomous driving vehicles.

According to the twentieth aspect discussed above, the lane characteristic values which are given to the autonomous driving vehicles disperse in the entire range of the variation region, whereby the distribution targets can be achieved. If the different lane characteristic values are given to the individual autonomous driving vehicles, the lane characteristic values disperse in the entire range of the variation region by a number of autonomous driving vehicles gathering. Consequently, according to the present aspect, different lane characteristic values are given to the individual autonomous driving vehicles, whereby the distribution targets can be realized.

According to the twenty-first aspect discussed above, the standard travel lane is determined based on comparison of the lane threshold values and the lane characteristic value. When the individual autonomous driving vehicles are given different lane characteristic values, dispersion corresponding to dispersion of the lane characteristic values occur to the standard travel lanes which are determined in the individual vehicles. Consequently, according to the present aspect, the lane characteristic values having dispersion are given to a number of autonomous driving vehicles, whereby the standard travel lanes thereof can be dispersed more minutely.

According to the twenty-second aspect discussed above, the lane threshold values which are set for the respective lanes of the multiple-lane area are set in correspondence with the vehicle distribution targets. The distribution of the standard travel lanes in the case where a number of autonomous driving vehicles gather changes in accordance with the lane threshold values. Consequently, if the lane threshold values are set in correspondence with the distribution targets, the standard travel lanes of a number of autonomous driving vehicles can be dispersed to match with the vehicle distribution targets.

According to the twenty-third aspect discussed above, the characteristic concerning lane selection of the driver is reflected in the lane characteristic value. The standard travel lane is set in accordance with the lane characteristic value. Consequently, according to the present aspect, the standard travel lane that is set during autonomous driving can be made in line with the characteristic of the driver.

According to the twenty-fourth aspect discussed above, the lane threshold values are corrected so that the real vehicle distribution approaches the distribution targets. In the autonomous driving vehicles in which the lane threshold values are corrected, the standard travel lanes are determined so that the real vehicle distribution approaches the distribution targets. Consequently, according to the present aspect, the vehicle distribution which is actually realized by a number of vehicles can be brought close to the distribution targets.

According to the twenty-fifth aspect discussed above, the gradual changing area is set in the section including the change point of the distribution targets, and the distribution targets can be gradually changed in the gradual changing area. If there is no setting of the gradual changing area, a number of autonomous driving vehicles perform lane change simultaneously before and after the change point. According to the present aspect, concentration of lane changes like this can be avoided.

According to the twenty-sixth aspect discussed above, under the situation where keep of the lane is recommended, the standard travel lanes can be determined in the mode that does not cause dispersion. During traveling of vehicles, the vehicles may encounter the situation where lane change to the specific lane is unsuitable, such as passage of an emergency vehicle and lane restrictions due to construction. According to the present aspect, it can be prevented that some of the autonomous driving vehicles perform lane change to an unsuitable lane under the situation like this.

BRIEF DESCRIPTION OF THE DRAWINGS

FIG. 2 is a diagram for explaining a process along which the autonomous driving vehicle illustrated in FIG. 1 creates a lane plan;

DETAILED DESCRIPTION

First Embodiment

[Hardware Configuration of First Embodiment]

Figure 1:
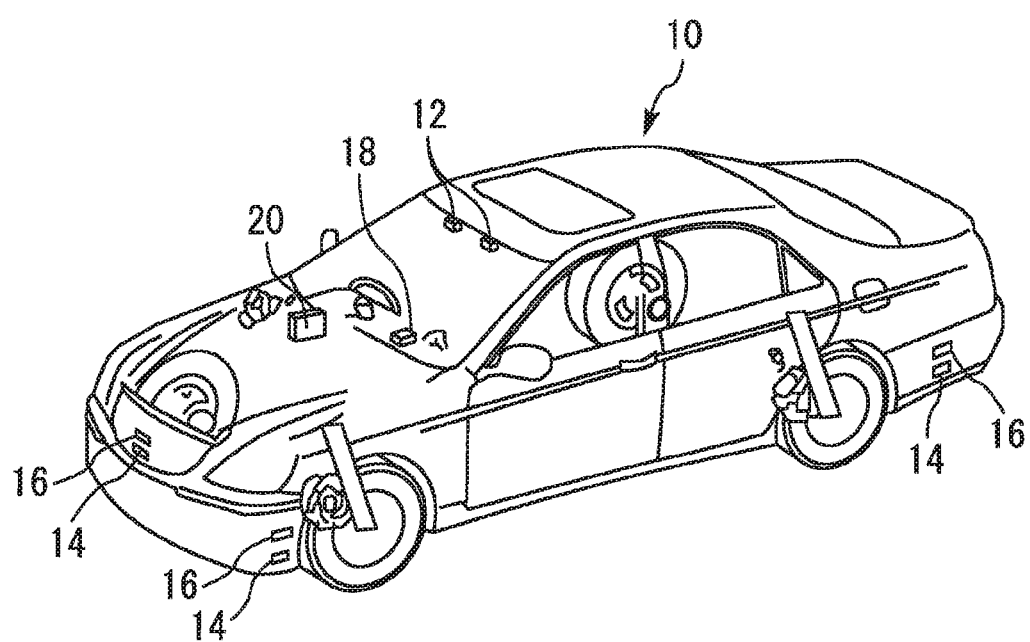
FIG. 1 is a view illustrating a hardware configuration of an autonomous driving vehicle according to a first embodiment of the present disclosure.

FIG. 1 is a view illustrating a hardware configuration of an autonomous driving vehicle 10 according to a first embodiment of the present disclosure. As illustrated in FIG. 1, the vehicle 10 is equipped with a stereo camera 12. The stereo camera 12 can capture a stereo image of a region in front of the vehicle 10 at a predetermined viewing angle. Note that the stereo camera 12 can be replaced with a monocular camera.

In the vehicle 10, a plurality of LIDAR (Laser Imaging Detection and Ranging) units 14 are installed in such a manner as to surround the vehicle. More specifically, six LIDAR units 14 in total are installed so that the region in front of the vehicle, regions in the left and right front of the vehicle, a region behind the vehicle, and regions in the left and right behind the vehicle are detected. According to the LIDAR units 14, outlines of objects that are present in the respective detection regions and distances to the objects can be detected.

In the vehicle 10, a plurality of millimeter wave radar units 16 are installed in such a manner as to surround the vehicle. Five millimeter wave radar units 16 in total are installed so that the region in front of the vehicle, regions in the left and right front of the vehicle, and the regions in the left and right behind the vehicle are detected. According to the millimeter wave radar units 16, distances to the objects that are present in the respective detection regions, as well as relative speeds of the objects and the vehicle 10 can be detected.

Hereinafter, the stereo camera 12, the LIDAR units 14 and the millimeter wave radar units 16 that are described above will be generically referred to as "an object recognition sensor".

The vehicle 10 is equipped with a GPS (Global Positioning System) unit 18. According to the GPS unit 18, a present location of the vehicle 10 can be detected by using a GPS.

The vehicle 10 is equipped with an ECU (Electronic Control Unit) 20. Detection signals from the "object recognition sensors" and the GPS unit 18 described above are provided to the ECU 20. Based on these signals, the ECU 20 can detect an on-road structure such as a guard rail, other vehicles existing around and the like (hereinafter, referred to as "surrounding objects"). Although the ECU 20 may be physically divided into a plurality of units according to functions, these units are generically referred to as the ECU 20 in this specification.

[Lane Plan in Autonomous Driving Vehicle]

FIG. 2 is a diagram for explaining a process along which the autonomous driving vehicle 10 illustrated in FIG. 1 creates a lane plan. In the present embodiment, a navigation function is installed in the ECU 20. According to the navigation function, a route from a present location of the vehicle 10 to a designated destination can be retrieved.

In the ECU 20, map data is also stored. The map data includes information on a position of the destination, a lane connection structure in the route, attributes of lanes and a white line, a speed limit and the like. A gray area 22 illustrated in an upper tier in FIG. 2 is a group of points which are on the route retrieved by the function of the navigation and from which it is possible to physically arrive at the destination.

In a process of the vehicle 10 traveling from the present location to the destination, lane change may be required. An arrow section 24 illustrated in a middle tier in FIG. 2 shows a distance (including a margin) required for lane change. Further, a white triangle 26 illustrated in FIG. 2 shows a position in which the vehicle 10 has to complete lane change. The ECU 20 eliminates the arrow section 24 from the gray area 22 on the upper tier in FIG. 2 so as to calculate a gray area 28 in the middle tier in FIG. 2 which is an entire area where the autonomous driving vehicle 10 can travel. Hereunder, the area will be referred to as the "travelable area". The travelable area 28 is an area where the vehicle 10 can actually travel in the process of going to the destination from the present location.

In the travelable area 28, there exists an area 30 in which a plurality of lanes where travel of the vehicle is permitted are present. Hereinafter, the area 30 is referred to as a "multiple-lane area". The ECU 20 stores a rule for selecting a lane in the multiple-lane area 30.

A lower tier in FIG. 2 illustrates an example of a lane plan 32 which the ECU 20 creates in the travelable area 28 in accordance with the above described rule. When the lane plan 32 is created, the vehicle 10 basically travels in accordance with the plan 32, and when a necessity for passing or the like arises, the vehicle 10 properly corrects the lane plan 32 and goes to the destination.

Figure 3:
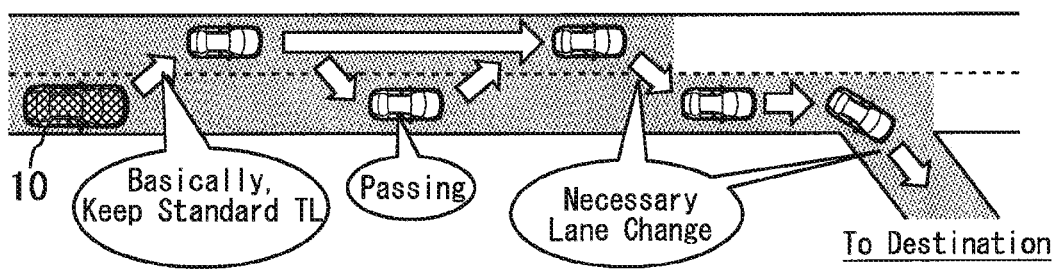
FIG. 3 is a diagram for explaining a rule by which the autonomous driving vehicle illustrated in FIG. 1 selects a traveling lane.

FIG. 3 is a diagram for explaining the rule which the ECU 20 complies with when selecting a traveling lane. For the vehicle 10, a standard travel lane is set. For example, in a left-hand traffic road, a left lane is set as the standard travel lane. Further, in a left-hand traffic road where a plurality of lanes are present, a left end lane is set as a travel lane, and a right side lane is set as a passing lane in general. In the road like this, the travel lane at the left end is set as the standard travel lane.

FIG. 3 shows a state where the vehicle 10 is traveling on the left end lane which is basically the standard travel lane. However, when a preceding vehicle at a low speed is present on the travel lane, execution of passing may be determined. In that case, the ECU 20 selects the passing lane only during passing. Further, a branch road leading to the destination may be provided at the passing lane side. In such a case, the ECU 20 also gives up the standard travel lane and selects the passing lane.

Under a situation where only one autonomous driving vehicle 10 is traveling on the road, there arises no problem as a result of the vehicle 10 selecting the lane in accordance with the above described rule. However, if a plurality of autonomous driving vehicles 10 select the same lane in accordance with the same rule, lane change is simultaneously performed in a specific spot, and a smooth traffic flow can be impaired. Therefore, in the present embodiment, in the "multiple-lane area" where a plurality of travelable lanes are present, the ECUs 20 are caused to select lanes so that dispersion occurs to the standard travel lanes.

[Feature of First Embodiment]

Figure 4:
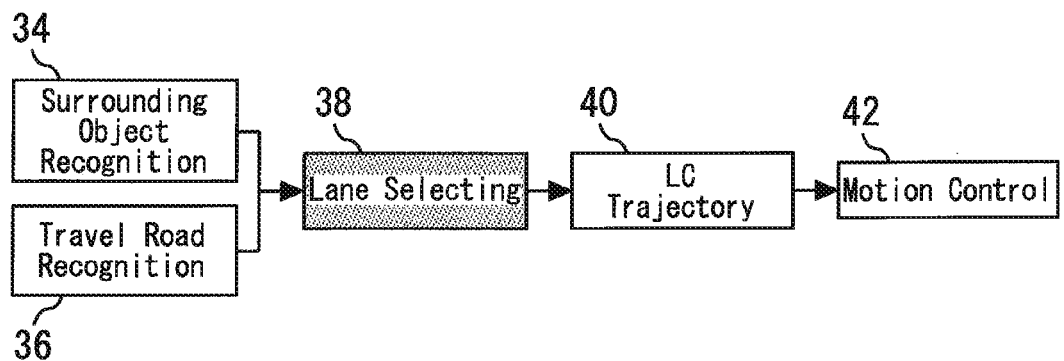
FIG. 4 is a block diagram showing a characteristic part of the autonomous driving vehicle illustrated in FIG. 1.

FIG. 4 is a block diagram showing a characteristic part of the ECU 20 in the present embodiment. In FIG. 4, a surrounding object recognition section 34 is realized by the ECU 20 performing surrounding object recognition processing. In the object recognition processing, "surrounding objects" such as other vehicles existing around are recognized based on a detection result of "object recognition sensors" such as the stereo Travelcameras 12.

A travel road recognition section 36 is realized by the ECU 20 executing travel road recognition processing. In the travel road recognition processing, a travel road of the autonomous driving vehicle 10 is recognized based on map information, GPS information, information on a white line that is recognized and the like. More specifically, the present location of the vehicle 10 is determined, and further, various situations of the route from the present location to the destination are recognized. A processing result of the surrounding object recognition section 34 and a processing result of the travel road recognition section 36 are provided to a lane selecting section 38.

The lane selecting section 38 is realized by the ECU 20 executing lane selection processing. In the lane selection processing, a travel lane of the vehicle 10 is determined based on the surrounding objects and the situations of the travel road which are recognized. On performing the lane selection processing, in the ECU 20, resolution is set in accordance with a kind of the road (a motorway, an ordinary road, and the like) and the like. For example, a resolution such as 1 m for other vehicle positions, and such as 5 km/h for other vehicle speeds are set. The ECUs 20 of the same model perform the same processing to the same inputs under the resolution. The ECU 20 of the present embodiment has a feature in that dispersion is caused to the standard travel lanes in a multiple-lane area under the condition like this.

Processing of causing the feature will be described in detail later with reference to FIG. 5.

A processing result of the lane selecting section 38 is supplied to a LC (Lane Change) trajectory section 40. Further, a processing result of the LC trajectory section 40 is provided to a motion control section 42. In the LC trajectory section 40, a trajectory (position at each time) of the autonomous driving vehicle 10 is calculated based on the travel lane selected by the lane selecting section 38. Further, in the motion control section 42, various actuators relating to steering, drive, braking and the like are controlled in order to realize the calculated trajectory.

Figure 5:
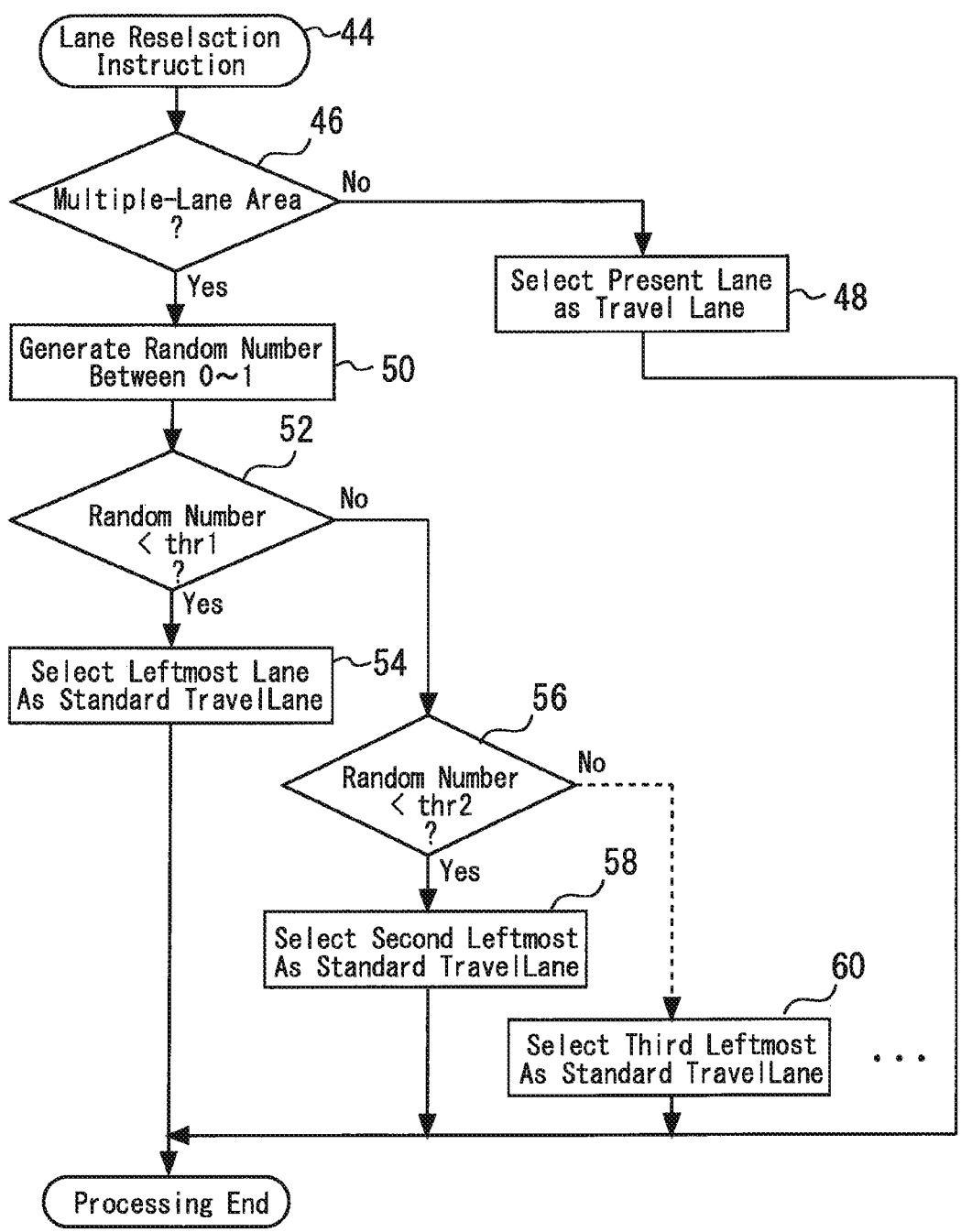
FIG. 5 is a flowchart for explaining the processing executed by the lane selecting section shown in FIG. 4.

FIG. 5 is a flowchart for explaining a characteristic part of travel lane determination processing that is executed by the ECU 20 as a part of the lane selection processing in the present embodiment. A routine illustrated in FIG. 5 is started by the ECU 20 recognizing a "lane reselection instruction" (step 44). Here, the ECU 20 recognizes the lane reselection instruction in timings as follows, for example.

(1) Traveling a fixed distance from lane selection of a previous time
(2) Lapse of a fixed time period after lane selection of the previous time
(3) Increase or decrease of the number of lanes in the traveling road When the ECU 20 recognizes the lane reselection instruction, it is determined whether or not the present travel road is in a multiple-lane area (step 46).

When it is determined that the present travel road is not in the multiple-lane area, it can be determined that there is no room for lane selection. In this case, the present lane is continuously selected as the travel lane (step 48). Hereinafter, the routine of this time is immediately ended.

When it is determined that the present travel road is a multiple-lane area, a random number of a real number is generated between zero and 1, first (step 50).

The ECU 20 stores as many lane threshold values thr1 (i=1 to n) as a number n of lanes on the road. For example, for a road with two lanes, two lane threshold values thr1 and thr2 are stored. Further, for a road with three lanes, three lane threshold values thr1, thr2 and thr3 are stored. These lane threshold values thri are used for determining which one of the plurality of lanes is set as the standard travel lane. In any case, the lane threshold value thri is set within a range from 0 to 1. Further, the n-th lane threshold value thrn is set at 1.0.

Note that in the present embodiment, the range of the random numbers is from zero to one, and the range is matched with a variation range of the lane threshold value thri. If only the range of the random numbers and the range of the lane threshold values thri are matched with each other, the range is not limited to the above described range.

The present embodiment is configured on the precondition of left-hand traffic. That is, the present embodiment is on the precondition that the travel lane is present at a left side in a multiple-lane area, and a passing lane is present at a right side. The lane threshold value thr1 is set as the threshold value for determining whether or not to set a leftmost lane as the standard travel lane. Further, the lane threshold value thrn is set as the threshold value for determining whether or not to set the n-th lane from the left as the standard travel lane.

When the processing in step 50 described above is finished in the routine illustrated in FIG. 5, it is determined whether or not the generated random number is smaller than the first lane threshold value thr1 (step 52). When it is determined that the random number is smaller than the lane threshold value thr1 as a result, the leftmost lane of the multiple-lane area is selected as the standard travel lane (step 54).

For example, in a motorway with two lanes or three lanes, the lane threshold value thr1 is set at 0.6. In this case, a probability of the random numbers falling below thr1 is 60%. Accordingly, the autonomous driving vehicle 10 selects a leftmost lane (travel lane) with a probability of 60%. When a plurality of autonomous driving vehicles 10 each selects the leftmost lane as the standard travel lane with a probability of 60%, 60% of the vehicles travel on the leftmost lane of the three lanes.

When the condition of step 52 described above is not satisfied, then it is determined whether or not the random number is smaller than the lane threshold value thr2 (step 56). When it is recognized that the above described condition is satisfied, the second lane from the left is selected as the standard travel lane (step 58).

When the multiple-lane area is a two-lane road, the second from the left is the n-th. In this case, the lane threshold value thr2 is set at 1.0, and therefore, the condition in step 56 is satisfied what value the random number may have. In this case, the routine of this cycle is ended at a time point when the processing in step 58 described above is finished. When the travel road is a motorway with two lanes, the autonomous driving vehicle 10 selects the second lane from the left as the standard travel lane with a probability of 40%. As a result, under a situation in which a number of autonomous driving vehicles are travelling, 60% of the vehicles are assigned to the leftmost lane, and 40% of the vehicles are assigned to the second lane.

When the multiple-lane area is the road with three lanes or more, thr2 may be set at a value smaller than 1.0. Under such a setting, there can arise a situation where it is determined that the condition in step 56 described above is not satisfied. In that case, the standard travel lane is determined thereafter based on comparison of the random number and the lane threshold value thr3 and the following lane threshold values thri (refer to step 60).

As described above, the autonomous driving vehicle 10 of the present embodiment selects different lanes as the standard travel lane with probabilities corresponding to the lane threshold values thri for the same input in the multiple-lane area. That is, the autonomous driving vehicle 10 of the present embodiment determines the standard travel lane with dispersion when the same environment is given in the multiple-lane area.

When the individual autonomous driving vehicles 10 determine the standard travel lanes with dispersion, dispersion occurs to the lanes on which the vehicles 10 travel, in the traffic system including a plurality of autonomous driving vehicles 10. Consequently, according to the present embodiment, a local overconcentration can be effectively prevented from occurring to a traffic flow in the traffic system which a number of autonomous driving vehicles 10 join.

Second Embodiment

Next, a second embodiment of the present disclosure will be described with reference to FIG. 6. The autonomous driving vehicle 10 of the present embodiment has the same hardware configuration as in the case of the first embodiment. The present embodiment can be realized by causing the ECU 20 to execute a routine illustrated in FIG. 6 instead of the routine illustrated in FIG. 5 described above, as the travel lane determination processing.

Figure 6:
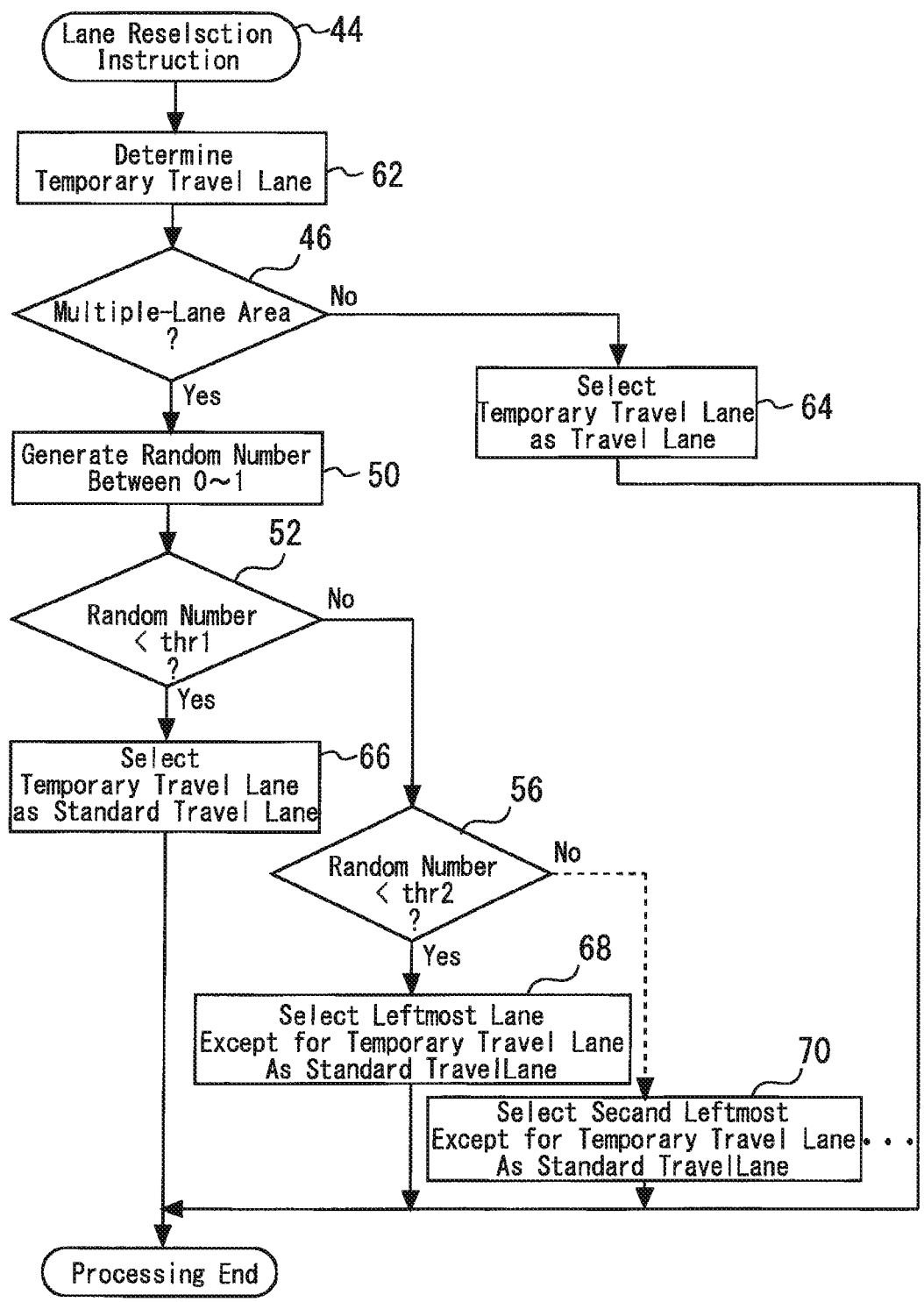
FIG. 6 is a flowchart for explaining the processing executed by the lane selecting section in a second embodiment of the present disclosure.

The ECU 20 starts the routine illustrated in FIG. 6 by recognizing the lane reselection instruction as in the case of the routine illustrated in FIG. 5 (step 44). Hereunder, in FIG. 6, the same or corresponding steps as or to the steps illustrated in FIG. 5 are assigned with the common reference signs, and explanation thereof will be omitted or simplified.

When the routine illustrated in FIG. 6 is started, a travel lane is temporarily determined first (step 62). Here, the travel lane is temporarily determined based on a recognition result of surrounding objects and the recognition result of a travel road, without considering generation of dispersion. Accordingly, in the autonomous driving vehicles 10 placed under the same environment, the same lane is temporarily determined as the travel lane. Hereunder, the lane will be referred to as the "temporary travel lane".

Next, in step 46, it is determined whether or not the present travel road corresponds to a multiple-lane area. When the above described determination is negated, there is no room for lane selection, so that the temporary travel lane is directly selected as the travel lane (step 64).

When it is determined that the present travel road corresponds to a multiple-lane area, the processing in steps 50 and 52 is sequentially performed. As in the case of the first embodiment, n of the lane threshold values thri the number of which is the same as the number n of lanes of the travel road are set. Further, the n-th lane threshold value thrn is set as 1.0. However, in the present embodiment, the first lane threshold value thr1 is used for determining whether or not to adopt the temporary travel lane. Consequently, when it is determined that the random numbers are smaller than the lane threshold value thr1 in step 52, the temporary travel lane is selected as the standard travel lane (step 66).

In the present embodiment, the second lane threshold value thr2 is used for determining whether or not to adopt "a first lane from the left except for the temporary travel lane". Further, a third lane threshold value thr3 is used for determining whether or not to adopt a "second lane from the left except for the temporary travel lane". The same applies to a lane threshold value thr4 and the following lane threshold values. The standard travel lane is determined properly based on those lane threshold values when the condition in step 52 described above is not satisfied (refer to steps 68 and 70).

As described above, the autonomous driving vehicle 10 of the present embodiment firstly determines the temporary travel lane corresponding to the surrounding objects and the situation of the travel road. Subsequently, while the temporary travel lane is set as the precondition, the standard travel lane is determined so that dispersion occurs. The first embodiment shows the example in which the first lane threshold value thr1 is set as 0.6. In the present embodiment, the first lane threshold value thr1 is also desirably set at a value exceeding 0.5. According to the setting like this, the temporary travel lane is selected as the standard travel lane with a probability exceeding 50%. The temporary travel lane is determined in correspondence with the around objects and the actual situation of the travel road, and is the most suitable lane for the autonomous driving vehicle 10 as long as generation of dispersion is not taken into consideration. According to the present embodiment, a local overconcentration in a traffic flow can be prevented as in the case of the first embodiment while the probability of the most suitable lane like this being selected as the standard travel lane is secured to be 50% or more.

Third Embodiment

Next, a third embodiment of the present disclosure will be described with reference to FIGS. 7 and 8. The autonomous driving vehicle 10 of the present embodiment has the same hardware configuration as in the case of the first embodiment. The present embodiment has a feature in that the autonomous driving vehicle 10 determines a vehicle distribution target in accordance with a travel road, and gives dispersion to the standard travel lane so that the distribution target is achieved.

Figure 7:
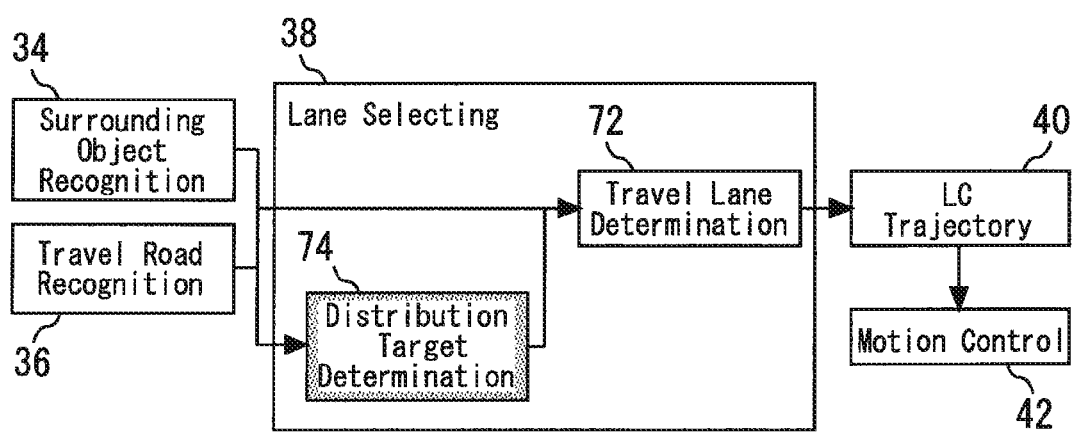
FIG. 7 is a block diagram showing a characteristic part of a third embodiment of the present disclosure.

FIG. 7 is a block diagram showing a characteristic part of the ECU 20 in the present embodiment. Hereunder, in FIG. 7, the same or corresponding elements as or to the elements illustrated in FIG. 4 will be assigned with the common reference signs and explanation thereof will be omitted or simplified.

In the present embodiment, the lane selecting section 38 includes a distribution target determination section 74 as well as a travel lane determination section 72. The travel lane determination section 72 is a part that is realized by the ECU 20 executing the travel lane determination processing (refer to FIG. 5) in the first embodiment. The distribution target determination section 74 is realized by the ECU 20 realizing distribution target determination processing. In the distribution target determination processing, a vehicle distribution target is determined for each lane in the present travel road, and further, the lane threshold values thri of the respective lanes are set in accordance with the distribution targets.

Figure 8:
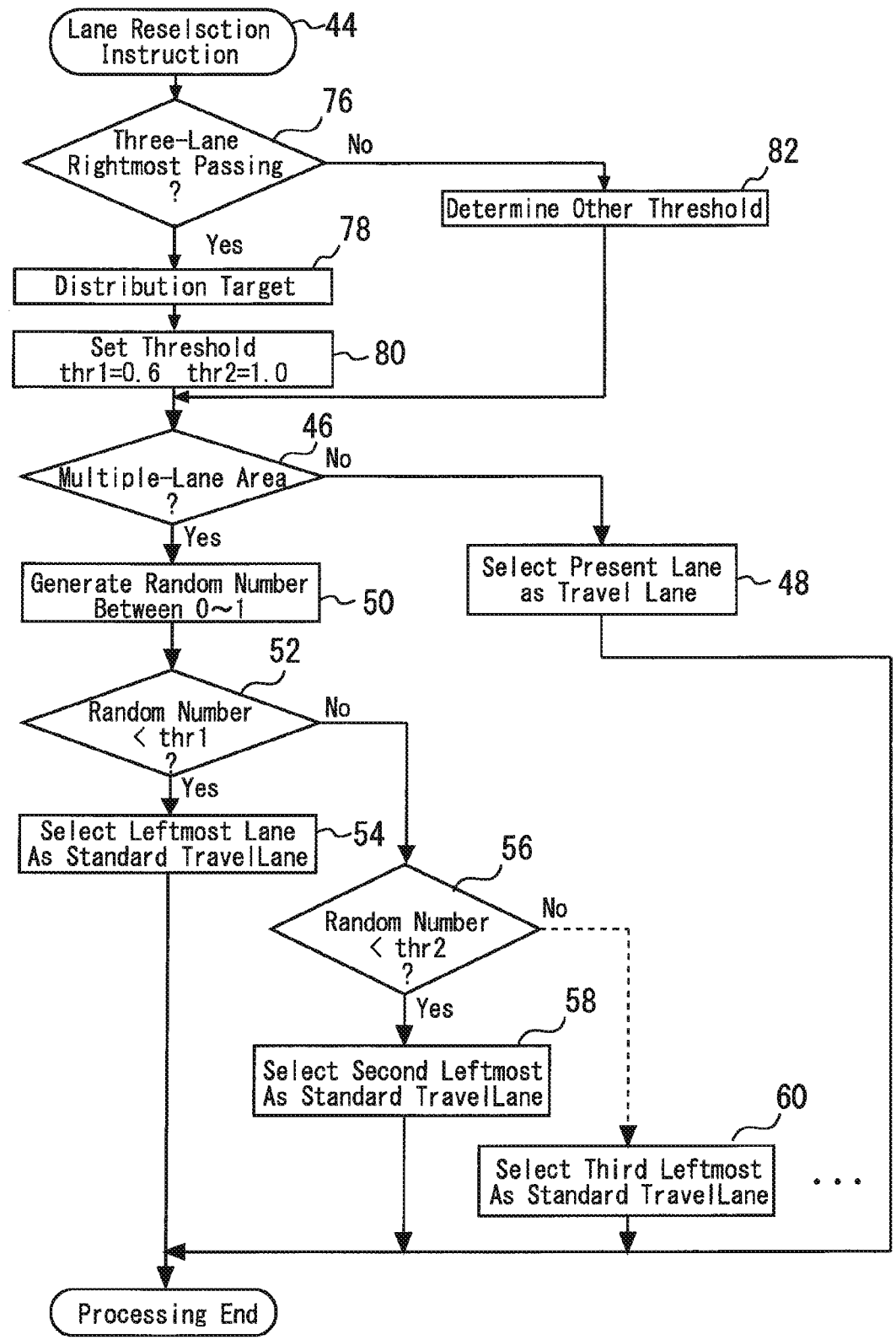
FIG. 8 is a flowchart for explaining the processing executed by the lane selecting section in the third embodiment of the present disclosure.

FIG. 8 is a flowchart for explaining a characteristic part of lane selection processing that is executed by the ECU 20 in the present embodiment. A routine illustrated in FIG. 8 is started by the ECU 20 recognizing the lane reselection instruction as in the routine illustrated in FIG. 5 (step 44).

When the routine illustrated in FIG. 8 is started, it is firstly determined whether a present travel road of the autonomous driving vehicle 10 is a three-lane road and a rightmost lane is a passing lane (step 76). For example, when the present travel road is a three-lane motorway, establishment of the above described condition is determined.

When establishment of the above described condition is recognized, the vehicle distribution targets are subsequently determined with respect to the respective lanes in the present travel road (step 78). The ECU 20 stores the distribution target of each of the lanes in correspondence with characteristics of the road (a lane configuration and a road type). Here, the memory is read, and thereby the distribution targets of a leftmost lane, a central lane, and a passing lane are determined as 60%, 40% and 0%, respectively, for example.

Next, the lane threshold values thri of the respective lanes are set in accordance with the determined distribution targets (step 80). Here, specifically, the lane threshold value thr1 corresponding to the leftmost lane is set as 0.6, and the lane threshold value thr2 corresponding to the central lane is set as 1.0. The lane threshold value thr3 of the passing lane is not used in the processing, and therefore, setting is omitted here.

Thereafter, the travel lane determination processing similar to the case of the first embodiment is executed by using the lane threshold values thr1 and thr2 which are set in the above described processing (steps 46 to 60). The content of the travel lane determination processing is similar to the case of the first embodiment. Since the random numbers are set between zero and 1, 60% of the random numbers have values smaller than the lane threshold value thr1. Consequently, the autonomous driving vehicle 10 selects the leftmost lane as the standard travel lane with a probability of 60% (refer to steps 52 and 54).

Since all the random numbers have values smaller than thr2 (=1.0), 40% of the random numbers which are equal to or larger than thr1 are all determined to fall below thr2 (refer to step 56). Consequently, the autonomous driving vehicle 10 selects the central lane as the standard travel lane with a probability of 40% (refer to step 58).

As described above, according to the routine illustrated in FIG. 8, in the three-lane road in which the rightmost lane is the passing lane, the autonomous driving vehicles 10 can be allowed to select the leftmost lane, the central lane and the passing lane as the standard travel lane with probabilities of 60%, 40% and 0% respectively. When the individual autonomous driving vehicles 10 disperse to the respective lanes with the probabilities as above, the distribution according to the distribution targets determined in step 78 is realized in the traffic flow including a plurality of autonomous driving vehicles 10.

When it is determined that the travel road of the autonomous driving vehicle 10 is not a three-lane road in which the rightmost lane is a passing lane in step 76 described above in the routine illustrated in FIG. 8, other threshold setting processing is executed (step 82). In this step, a determination processing equivalent to that in step 76 is executed one by one while sequentially changing a judgment condition until the road condition that corresponds to the present travel road is found firstly. When the road condition that corresponds to the present travel road is found, the distribution targets and the lane threshold values thri that correspond to the road condition are set by processing equivalent to those in steps 78 and 80.

According to the above processing, a plurality of autonomous driving vehicles 10 can be dispersed to the respective lanes with the distribution targets suitable to the characteristics of the road, in the multiple-lane area. Further, the individual autonomous driving vehicles 10 determine the standard travel lanes with dispersion as in the case of the first embodiment. Consequently, a local overconcentration can be prevented from occurring to a traffic flow as in the case of the first embodiment.

[Modification Example of Third Embodiment]

In the aforementioned third embodiment, the ECU 20 executes the travel lane determination processing (steps 46 to 60) similar to the case of the first embodiment. The travel lane determination processing may be replaced with the processing executed in the second embodiment (refer to FIG. 6).

Further, in the aforementioned third embodiment, the distribution targets of the travel road are stored by the autonomous driving vehicle 10. The distribution targets may be provided to the autonomous driving vehicle 10 from a communication system that is provided at the road side. Alternatively, the autonomous driving vehicle 10 may have a communication system which receives the distribution targets provided by a server which is set outside the vehicle. In this case, the ECU 20 may receive the distribution targets from the communication system.

Fourth Embodiment

In the aforementioned first to third embodiments, lane selection is performed with the same probabilities in all the autonomous driving vehicles 10. For example, on the travel road in which the lane threshold value thr1 is 0.6, and the lane threshold value thr2 is 1.0, all the autonomous driving vehicles 10 select the first lane with a probability of 60%, and selects the second lane with a probability of 40%.

According to the above described method, vehicle dispersion with a ratio of 6:4 can be realized as a whole in the traffic flow in which a number of autonomous driving vehicles 10 gather. However, in the individual autonomous driving vehicles 10, a situation arises, in which the lanes are selected at random without consistency. In that case, drivers of the vehicles 10 cannot predicts lane selection, and therefore, being apt to feel a sense of discomfort.

Dispersing the autonomous driving vehicles 10 at a ratio of 6:4 can be also realized by causing 60% of the autonomous driving vehicles 10 to mainly select the first lane, and causing 40% of the autonomous driving vehicles 10 to mainly select the second lane, besides the above described method. According to a method like this, consistency concerning lane selection can be given to the individual autonomous driving vehicles 10. The fourth embodiment of the present disclosure has a feature in that the individual autonomous driving vehicles 10 are given peculiar lane characteristic values that are set at random, and perform lane selection with probabilities corresponding to the lane characteristic values.

Figure 9:
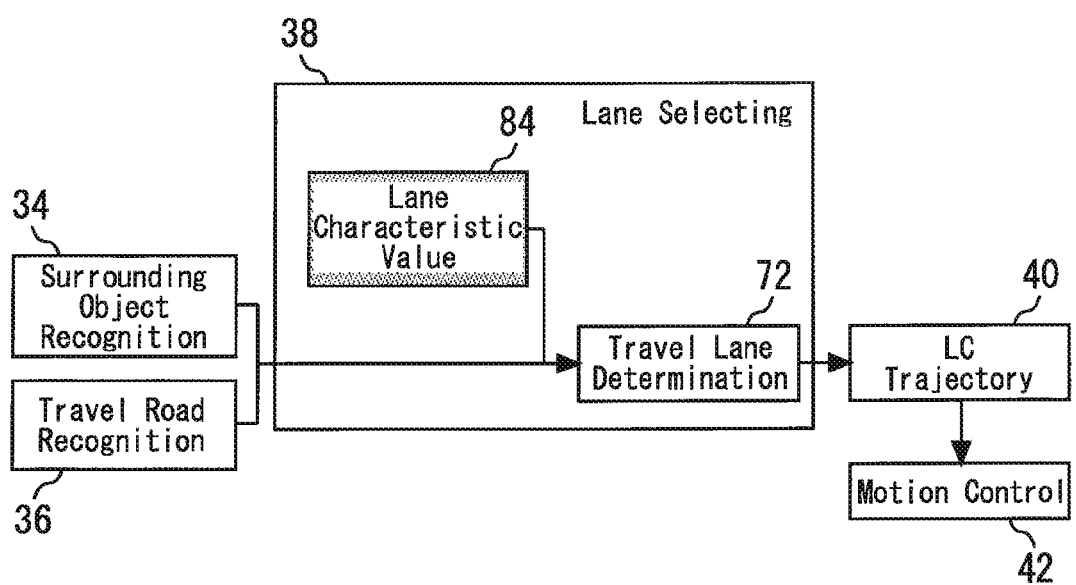
FIG. 9 is a block diagram showing a characteristic part of a fourth embodiment of the present disclosure.

Hereunder, the feature of the fourth embodiment of the present disclosure will be described in detail with reference to FIGS. 9 and 10. The autonomous driving vehicle 10 of the present embodiment can be realized by the same hardware configuration as in the case of the first embodiment. FIG. 9 is a block diagram showing a characteristic part of the ECU 20 in the present embodiment. Note that in FIG. 9, the same or corresponding elements as or to the elements illustrated in FIG. 7 will be assigned with common reference signs, and explanation thereof will be omitted or simplified.

As illustrated in FIG. 9, in the present embodiment, the lane selecting section 38 includes a lane characteristic value section 84 as well as the travel lane determination section 72. In the ECU 20, the lane characteristic value set at random is recorded at a time of factory shipment or entry into a garage of a dealer of the autonomous driving vehicle 10. The lane characteristic value section 84 is realized by the ECU 20 executing lane characteristic value processing that will be described later based on the lane characteristic value.

Figure 10:
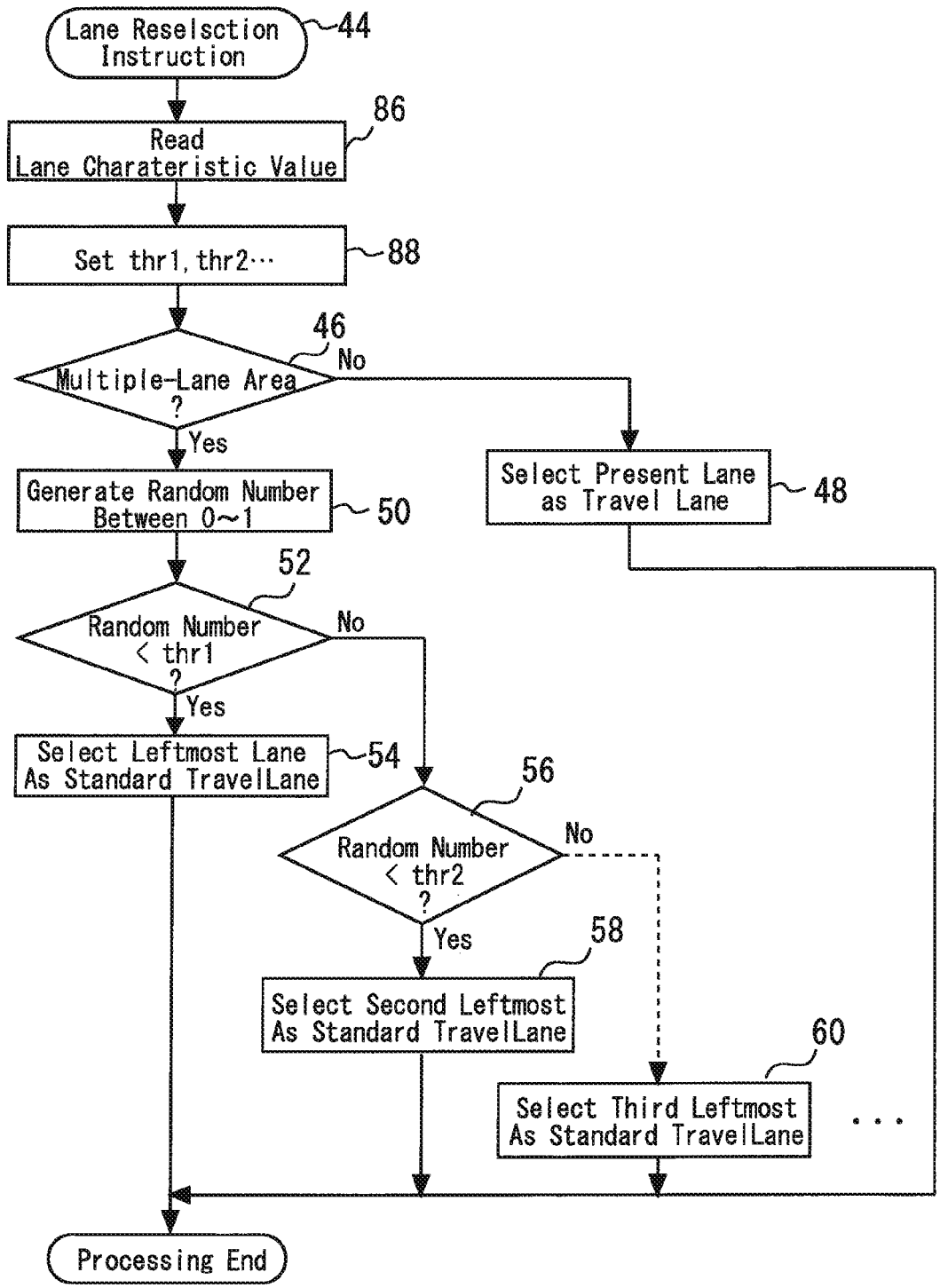
FIG. 10 is a flowchart for explaining the processing executed by the lane selecting section in the fourth embodiment of the present disclosure.

FIG. 10 is a flowchart for explaining a characteristic part of lane selection processing that is executed by the ECU 20 in the present embodiment. In a routine illustrated in FIG. 10, the lane characteristic value processing (steps 86 and 88), and travel lane determination processing (steps 46 to 60) are included. The travel lane determination processing is the same as in the case of the first embodiment (refer to FIG. 5), and therefore, explanation thereof will be omitted here.

The routine illustrated in FIG. 10 is started by the ECU 20 recognizing the lane reselection instruction as in the routine illustrated in FIG. 5 (step 44). When the routine is started, the lane characteristic value which is given to the autonomous driving vehicle 10 is read first (step 86).

Next, setting of the lane threshold value thri is performed based on the lane characteristic value (step 88). As for the lane threshold value thri corresponding to the two-lane road, for example, the values of thr1 and thr2 are set. Further, as for the lane threshold value thri corresponding to a three-lane road, the values of thr1, thr2 and thr3 are set.

When an example of the case where two of thr1 and thr2 are set, they are set in such a manner that (thr1, thr2)=(0.8, 1.0) or (thr1, thr2)=(0.2, 1.0) in accordance with the lane characteristic value. The autonomous driving vehicle to which the former setting is applied selects the first lane as the standard travel lane with a probability of 80%, and selects the second lane as the standard travel lane with a probability of 20%. The autonomous driving vehicle by the latter setting selects the first lane with a probability of 20%, and selects the second lane with a probability of 80%. That is, according to the former setting, an individual character that mainly selects the first lane can be given to the autonomous driving vehicle 10. In contrast, according to the latter setting, an individual character that mainly selects the second lane can be given to the autonomous driving vehicle 10.

Further, according to a setting of (thr1, thr2)=(1.0, an arbitrary value), an individual character that selects the first lane with a probability of 100% can be given to the autonomous driving vehicle 10. According to a setting of (thr1, thr2)=(0.0, 1.0), an individual character that selects the second lane with a probability of 100% can be given to the autonomous driving vehicle 10. In this way, according to the present embodiment, a consistent individual character concerning lane selection can be given to the individual autonomous driving vehicle 10.

As described above, the lane characteristic values which are set at random are given to the individual autonomous driving vehicles 10. Consequently, when a number of autonomous driving vehicles 10 gather, the lane characteristic values given to the autonomous driving vehicles 10 are uniformly dispersed within a variation region of the lane characteristic values. The autonomous driving vehicles 10 having different lane characteristic values show different individual characters concerning lane selection. Consequently, in the traffic flow which a number of autonomous driving vehicles 10 join, dispersion occurs in the standard travel lanes, and the traffic flow without an imbalance is realized. In this way, according to the present embodiment, a local overconcentration can be effectively prevented from occurring to the traffic flow which a number of autonomous driving vehicles 10 join, while individual characters concerning lane selection are given to the individual autonomous driving vehicles 10.

[Modification Example of Fourth Embodiment]

In the aforementioned fourth embodiment, the lane threshold values thri are set based on the lane characteristic values which are set at random, and thereby, the individual characters concerning lane selection are given to the individual autonomous driving vehicles 10. However, a method for giving the individual characters to the autonomous driving vehicles 10 is not limited to this. For example, the lane threshold values thri may be used in common by all the vehicles 10 if the processing is modified so that the individual autonomous driving vehicles 10 select the standard travel lanes based on comparison of the lane characteristic values and the lane threshold value thri. In this case, the individual autonomous driving vehicles 10 have the individual characters corresponding to the lane characteristic values. Further, since the lane characteristic values are random values, various individual characters coexist when a number of autonomous driving vehicles 10 gather, and a traffic flow without a local overconcentration can be realized.

Further, in the aforementioned fourth embodiment, the lane characteristic value is recorded in the autonomous driving vehicle 10 at a time of factory shipment or entry into the garage of a dealer. However, timing for recording the lane characteristic value is not limited to the above. For example, the lane characteristic value may be recorded when the autonomous driving vehicle 10 receives a write instruction from an external device placed outside the vehicle.

Fifth Embodiment

Next, a fifth embodiment of the present disclosure will be described with reference to FIGS. 11 to 15. The autonomous driving vehicle 10 of the present embodiment has the same hardware configuration as in the case of the first embodiment. The present embodiment has a feature in that the autonomous driving vehicle 10 has both the feature of the third embodiment and the feature of the fourth embodiment. Specifically, the present embodiment has a feature in that the autonomous driving vehicle 10 has an individual character concerning lane selection, and determines the standard travel lane so that the distribution target of the travel road is achieved.

Figure 11:
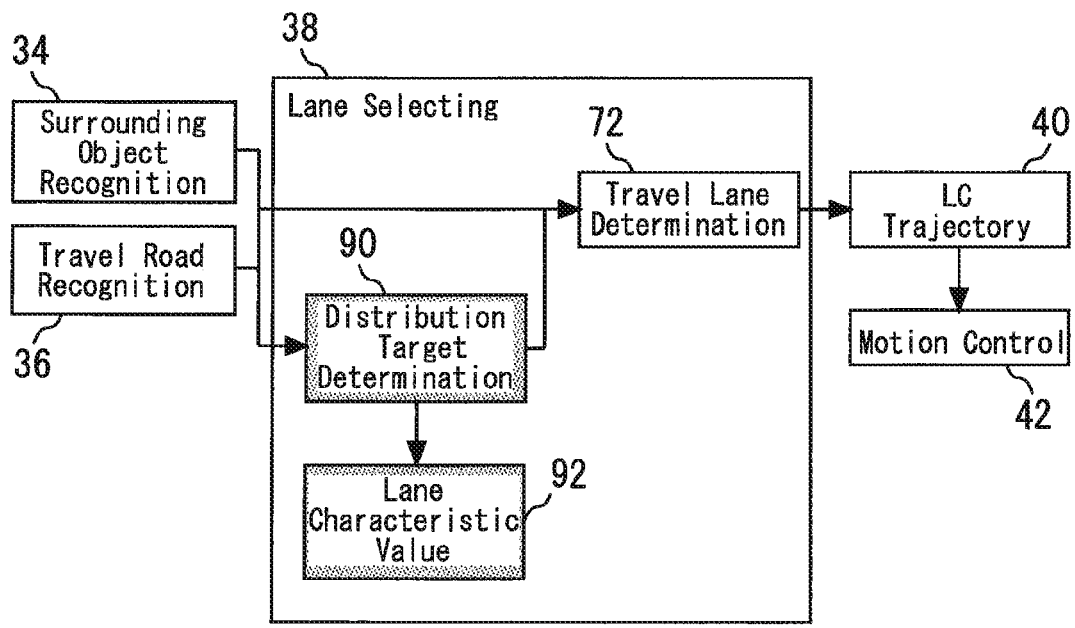
FIG. 11 is a block diagram showing a characteristic part of a fifth embodiment of the present disclosure.

FIG. 11 is a block diagram showing a characteristic part of the ECU 20 in the present embodiment. Hereunder, in FIG. 11, the same or corresponding elements as or to the elements illustrated in FIG. 7 will be assigned with common reference signs and explanation thereof will be omitted or simplified.

In the present embodiment, the lane selecting section 38 includes a distribution target determination section 90 and a lane characteristic value section 92 as well as the travel lane determination section 72. As in the case of the fourth embodiment, in the present embodiment, the autonomous driving vehicle 10 is given the lane characteristic value which is set at random. The lane characteristic value section 92 is realized by the ECU 20 performing processing of reading the lane characteristic value and providing the lane characteristic value to the distribution target determination section 90.

Further, the distribution target determination section 90 is realized by the ECU 20 performing the following processing in distribution target determination processing of:

(1) setting the vehicle distribution target in the present travel road, (2) selecting of the threshold value map for realizing the distribution target being set above, and (3) determining the lane threshold values thri of the respective lanes in accordance with the threshold value map being set above.

Figure 12:
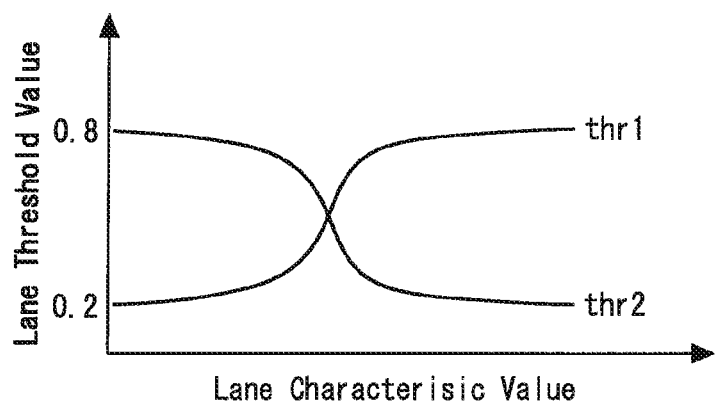
FIG. 12 illustrates an example of a map showing a relationship between the lane characteristic value and the lane threshold value used in the fifth embodiment of the present disclosure.

FIG. 12 illustrates one example of the threshold value map which is set in the step of the above described (2) with a three-lane road. In FIG. 12, throughout an entire range of the variation region of the lane characteristic value, the lane threshold value thr1 of the first lane and the lane threshold value thr2 of the second lane are set. The individual autonomous driving vehicle 10 applies the lane characteristic value given to itself to the map illustrated in FIG. 12, and thereby sets the lane threshold values thr1 and thr2.

Figure 13:
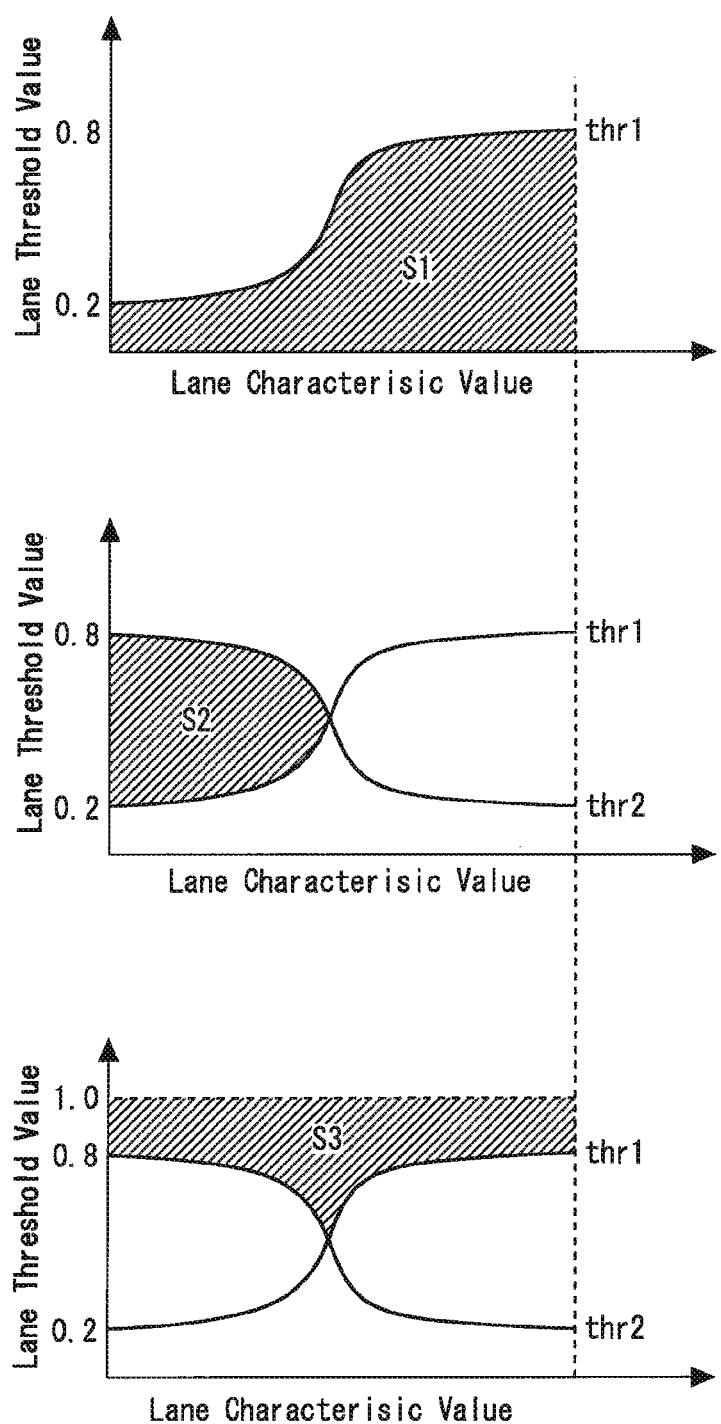
FIG. 13 is a diagram for explaining distribution possibilities in the three areas divided by the lane threshold values thr1 and thr2 shown in FIG. 12.

An upper tier in FIG. 13 illustrates an expected value S1 of the first lane being selected based on the map illustrated in FIG. 12. In the present embodiment, the lane characteristic values are set at random. Consequently, when a number of autonomous driving vehicles 10 gather, the lane characteristic values of the vehicles 10 disperse uniformly to the entire range of the variation region. The individual autonomous driving vehicle 10 selects the first lane as the standard travel lane when the generated random number is smaller than the lane threshold value thr1, as in the case of the first embodiment. In this case, in the traffic flow which a number of autonomous driving vehicles 10 join, the expected value of these vehicles 10 selecting the first lane corresponds to an area S1 illustrated on the upper tier in FIG. 13.

A middle tire in FIG. 13 illustrates an expected value S2 of the second lane being selected based on the map illustrated in FIG. 12. The autonomous driving vehicle 10 selects the second lane as the standard travel lane when the generated random number is equal to or more than the first lane threshold value thr1 and are smaller than the second lane threshold value thr2, as in the case of the first embodiment.

Consequently, in the traffic flow which a number of autonomous driving vehicles 10 join, the expected value of the vehicles 10 selecting the second lane corresponds to an area S2 illustrated on the middle tier in FIG. 13.

A lower tier in FIG. 13 illustrates an expected value S3 of the third lane being selected based on the map illustrated in FIG. 12. The autonomous driving vehicle 10 selects the third lane as the standard travel lane when the generated random number is equal to or more than the first lane threshold value thr1 and is equal to or more than the second lane threshold value thr2, as in the case of the first embodiment. Consequently, in the traffic flow which a number of autonomous driving vehicles 10 join, the expected value of the vehicles 10 selecting the third lane corresponds to an area S3 illustrated on the lower tier in FIG. 13.

In the aforementioned distribution target determination processing, the threshold map is set so that S1:S2:S3 corresponds to the distribution targets. According to the threshold value map, a number of autonomous driving vehicles 10 having individual characters corresponding to the lane characteristic values respectively can be dispersed as the distribution targets.

Figure 14:
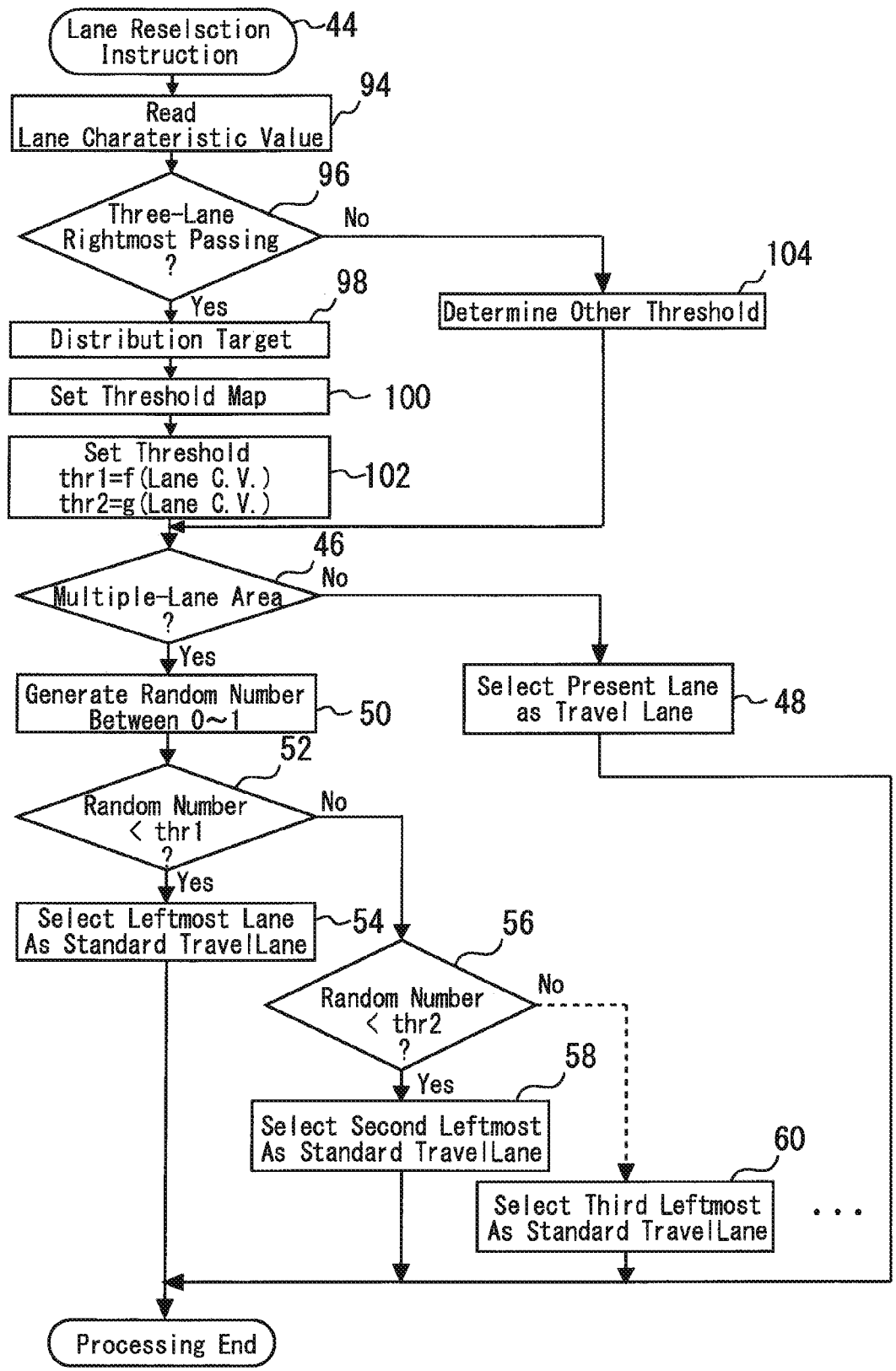
FIG. 14 is a flowchart for explaining the processing executed by the lane selecting section in the fifth embodiment of the present disclosure.

FIG. 14 is a flowchart for explaining a characteristic part of lane selection processing executed by the ECU 20 in the present embodiment. A routine illustrated in FIG. 14 includes the travel lane determination processing (steps 46 to 60) in addition to lane characteristic value processing (step 94) and distribution target determination processing (steps 96 to 104). The travel lane determination processing is the same as in the case of the first embodiment (refer to FIG. 5), and therefore, explanation will be omitted here.

The routine illustrated in FIG. 14 is started by the ECU 20 recognizing the lane reselection instruction as in the routine illustrated in FIG. 5 (step 44). When the routine is started, the lane characteristic value which is given to the autonomous driving vehicle 10 is read first (step 94).

Next, it is determined whether the present travel road is a three-lane road, and the rightmost lane is a passing lane (step 96). When the conditions is satisfied, the vehicle distribution targets are determined with respect to the respective lanes of the travel road (step 98). The processing in steps 96 and 98 is performed similarly to the processing in steps 76 and 78 illustrated in FIG. 8. Here, the distribution targets of the first lane, the second lane and the third lane of the travel road are determined as 60%, 20% and 20%, for example.

When the distribution targets are determined, the threshold value map is set next (step 100). According to the above described example, the threshold value map is set, in which the relationship between the lane threshold values thr1 and thr2 and the lane characteristic values is set so that S1:S2:S3 illustrated in FIG. 13 becomes 60:20:20.

Next, the lane threshold values thri of the respective lanes are set in accordance with the set threshold value map (step 102).

Figure 15:
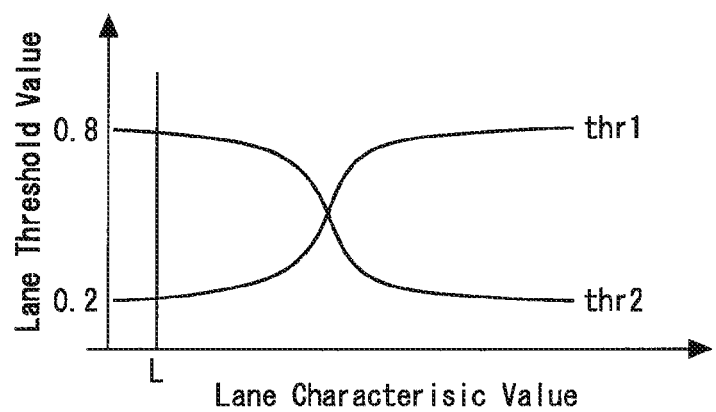
FIG. 15 illustrates an example of a map used in the flowchart shown in FIG. 14.

FIG. 15 illustrates a method for setting thr1 and thr2 in accordance with the threshold value map. The threshold value map illustrated in FIG. 15 is set so that S1:S2:S3=60:20:20 is established. When the lane threshold value of the autonomous driving vehicle 10 is L which is illustrated, thr1 is set at a value slightly larger than 0.2, and thr2 is set at a value slightly smaller than 0.8. In this case, the autonomous driving vehicle 10 is given an individual character that selects the first lane with a probability of substantially 20%, selects the second lane with a probability of substantially 60%, and selects the third lane with a probability of substantially 20%.

When the condition in step 96 described above is not satisfied in the routine illustrated in FIG. 14, other threshold setting processing is executed (step 104). In this step, until the road conditions corresponding to the present travel road are found, the determination processing corresponding to step 96 is executed first by sequentially changing the condition. When the road conditions corresponding to the present travel rod are found, the distribution target corresponding to the road condition and the lane threshold value thri are set by processing corresponding to steps 98 to 102.

According to the above processing, a number of autonomous driving vehicles 10 can be dispersed to the respective lanes so that the distribution targets are realizes, as in the case of the third embodiment. Further, the individual autonomous driving vehicle 10 can be given the individual character concerning lane selection, as in the case of the fourth embodiment. This results in that the individual autonomous driving vehicle 10 determines the standard travel lanes with dispersion, and a number of autonomous driving vehicles 10 show individual characters with dispersion. Then, a local overconcentration can be effectively prevented from occurring to the traffic flow.

[Modification Example of Fifth Embodiment]

In the aforementioned fifth embodiment, the threshold value map for realizing the distribution targets is created, and the individual autonomous driving vehicle 10 sets the lane threshold values thri in accordance with the threshold value map. However, the method for realizing the distribution targets is not limited to this. For example, the lane threshold values thri may be set as the distribution targets, and the individual autonomous driving vehicles 10 may select the standard travel lanes based on comparison of the lane characteristic values and the lane threshold values thri. For example, when the distribution targets are 60:20:20, thr1=0.6 and thr2=0.8 are set. The individual autonomous driving vehicles 10 are given the lane characteristic values which are set at random in a range from zero to one. In this case, the vehicle 10 which is given the lane characteristic value of less than 0.6 always selects the first lane, while the vehicle 10 which is given the lane characteristic value of 0.6 to 0.8 always selects the second lane, and the vehicle 10 which is given the lane characteristic value of 0.8 or more always selects the third lane. As a result, the individual autonomous driving vehicles 10 are given individual characters concerning lane selection. Further, when a number of autonomous driving vehicles 10 gather, the traffic flow having the distribution targets is realized as a result of various individual characters.

Sixth Embodiment

Next, a sixth embodiment of the present disclosure will be described with reference to FIGS. 16 and 17. The autonomous driving vehicle 10 of the present embodiment has the same hardware configuration as in the case of the first embodiment. Further, the autonomous driving vehicle 10 of the present embodiment is given the lane characteristic value which is set at random as in the case of the fourth embodiment. The ECU 20 executes the lane selection processing illustrated in FIG. 10 by using the lane characteristic value, as in the case of the fourth embodiment. The present embodiment has a feature in that the ECU 20 has a function of reflecting an input operation of a driver in the lane characteristic value.

Figure 16:
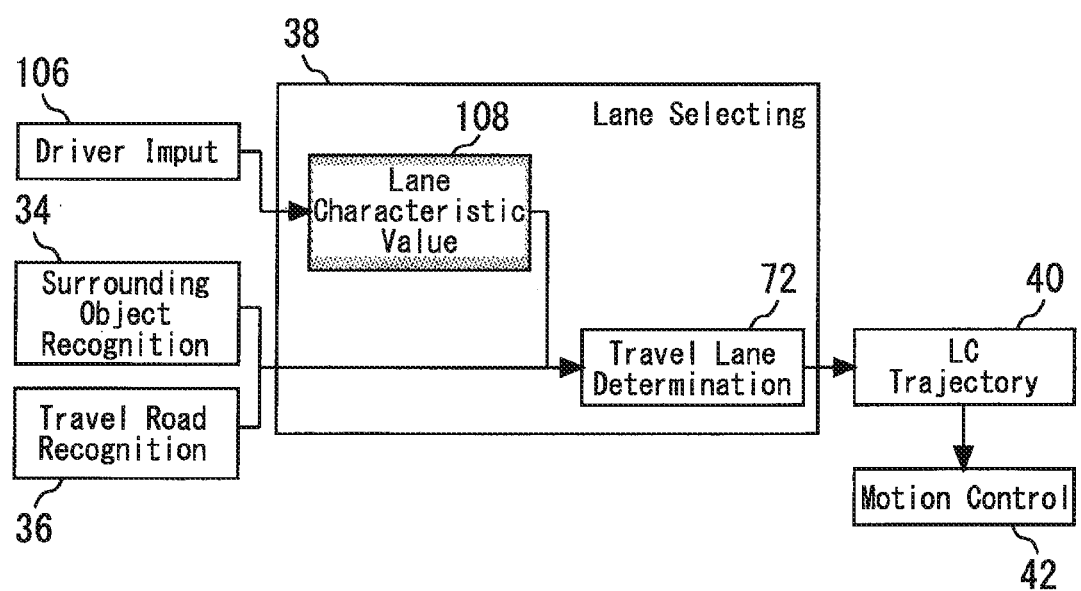
FIG. 16 is a block diagram showing a characteristic part of a sixth embodiment of the present disclosure.

FIG. 16 is a block diagram showing a characteristic part of the ECU 20 in the present embodiment. As illustrated in FIG. 16, the autonomous driving vehicle 10 of the present embodiment includes a driver input section 106. The driver input section 106 is an interface for a driver of the vehicle 10 to instruct reset of the lane characteristic value to the ECU 20.

The block diagram illustrated in FIG. 16 is the same as the block diagram of the fourth embodiment illustrated in FIG. 9, except that a signal from the driver input section 106 is provided to a lane characteristic value section 108. Hereunder, in FIG. 16, the same elements as the elements illustrated in FIG. 9 are assigned with the common reference signs, and explanation thereof will be omitted or simplified.

Figure 17:
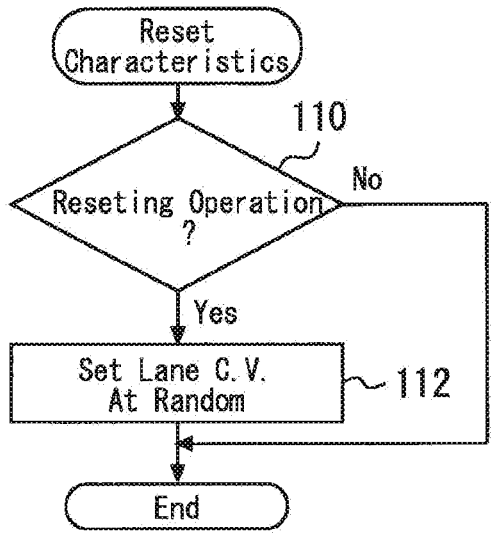
FIG. 17 is a flowchart for explaining the processing executed by the lane selecting section in the sixth embodiment of the present disclosure.

FIG. 17 is a flowchart of characteristic resetting processing that is executed by the ECU 20 to realize the lane characteristic value section 108 of the present embodiment. The routine is repeatedly started at predetermined periods after actuation of the autonomous driving vehicle 10.

When the routine illustrated in FIG. 17 is started, it is firstly determined whether or not a resetting operation of the lane characteristic value by the driver is performed (step 110). When the resetting operation is not detected, the routine of this cycle is immediately ended. When the resetting operation of the lane characteristic value is detected, processing of setting the lane characteristic value at random is performed (step 112).

In the aforementioned fourth embodiment, the lane characteristic value is set at random at a time of factory shipment or entry into the garage of a dealer of the autonomous driving vehicle 10. The individual character concerning lane selection of the autonomous driving vehicle 10 is determined in accordance with the lane characteristic value. Thus, in the case of the fourth embodiment, there can arise a situation in which the individual character of the autonomous driving vehicle 10 does not match with the sense of the driver.

According to the present embodiment, when the individual character of the autonomous driving vehicle 10 does not match with the sense of his or her own, the driver can change the individual character of the vehicle 10 by resetting the lane character value. Consequently, according to the present embodiment, the individual character of lane selection can be further adapted to the sense of the driver while the same effect as in the case of the fourth embodiment is achieved.

[Modification Example of Sixth Embodiment]

In the aforementioned sixth embodiment, the lane characteristic value is reset at random in response to the resetting operation of a driver, but a method for reset is not limited to this. For example, the driver may directly input the lane characteristic value itself in accordance with the individual character which is desired to be realized. Further, rewrite of the lane characteristic value may be performed by an input operation of a person other than the driver, or by a rewrite instruction from an external device that is placed outside the vehicle.

Further, in the aforementioned sixth embodiment, the lane characteristic value is reset in response to the resetting operation of the driver, but a method for changing the lane characteristic value is not limited to this. For example, a preference that appears in a driver operation may be reflected in the lane characteristic value.

Figure 18:
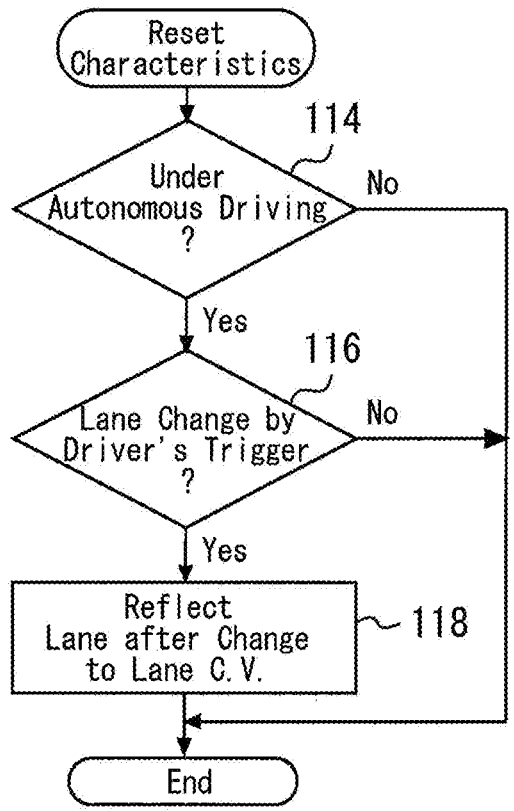
FIG. 18 is a flowchart for explaining a first modification of the processing executed by the lane selecting section in the sixth embodiment of the present disclosure.

FIG. 18 is a flowchart of a first example of characteristic reset processing of reflecting a preference of a driver in a lane characteristic value. When a routine is loaded, a steering angle sensor or the like that detects a steering operation functions as the driver input section 106.

In the routine illustrated in FIG. 18, it is firstly determined whether or not the autonomous driving is under implementation (step 114). When the autonomous driving is not under implementation, the processing of this cycle is immediately ended. When it is determined that the autonomous driving is under implementation, it is subsequently determined whether or not lane change by a trigger operation of the driver is performed (step 116).

When the driver performs a driving operation during autonomous driving, the autonomous driving vehicle 10 recognizes the operation as a trigger operation and returns the role of controlling the vehicle to the driver. Lane change by the trigger operation is performed when the driver feels a sense of discomfort in lane selection by autonomous driving. Consequently, a preference of the driver concerning lane selection is reflected in the trigger operation.

When lane change by the trigger operation is not recognized in step 116 described above, the processing of this cycle is immediately ended. When lane change by the trigger operation is recognized, a lane after the change is reflected in the lane characteristic value (step 118). For example, when lane change to a passing lane is performed by the trigger operation, the lane characteristic value is corrected so that a selection probability of the passing lane increases. Further, when lane change to a climbing lane is performed by the trigger operation, the lane characteristic value is corrected so that a selection probability of the climbing lane increases. According to the processing like this, the individual character of the autonomous driving vehicle 10 can be properly matched with the preference of the driver.

Figure 19:
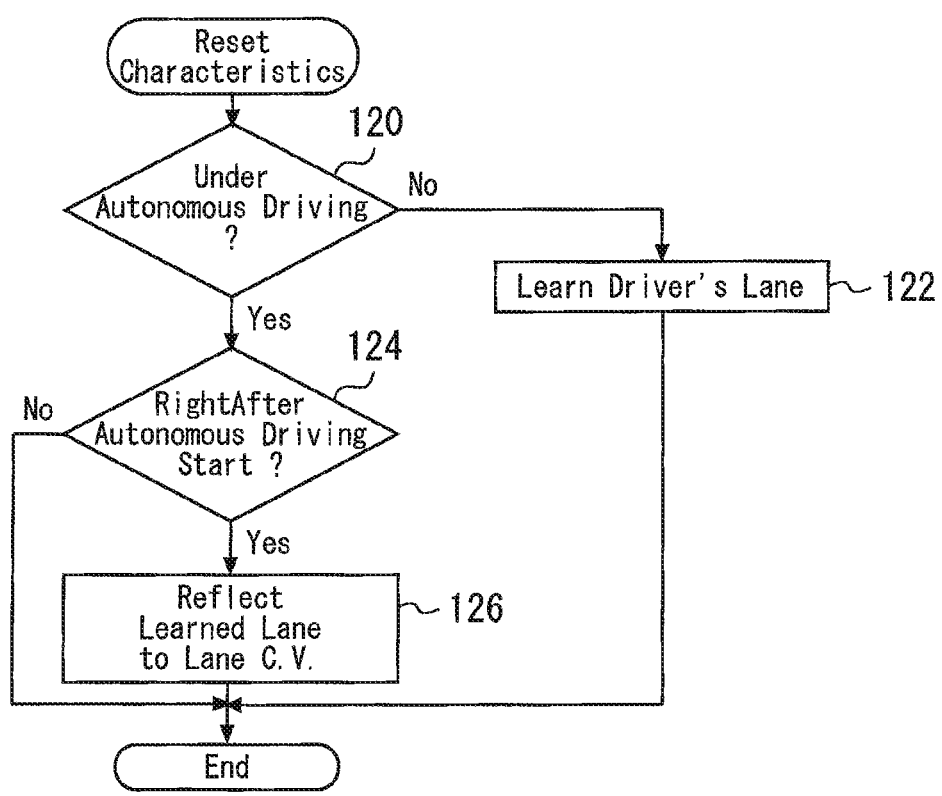
FIG. 19 is a flowchart for explaining a second modification of the processing executed by the lane selecting section in the sixth embodiment of the present disclosure.

FIG. 19 is a flowchart of a second example of the characteristic reset processing of reflecting the preference of the driver in the lane characteristic value. Even when the present routine is installed, a steering angle sensor or the like that detects a steering operation also serves as the driver input section 106.

In the routine illustrated in FIG. 19, it is firstly determined whether or not the autonomous driving is under implementation (step 120). When it is determined that the autonomous driving is not under implementation, it can be determined that the driver manually operates the autonomous driving vehicle 10. In this case, the ECU 20 advances learning on a lane which the driver selects (step 122). By the learning, the ECU 20 can detect the preference of the driver concerning lane selection.

When it is determined that the autonomous driving is under implementation in step 120 described above, it is determined whether or not the processing cycle of this time corresponds to a start time of the autonomous driving (step 124). When it is determined that the processing cycle does not correspond to the start time of the autonomous driving, the processing of this cycle is immediately ended. When it is determined that the processing cycle corresponds to the start time of the autonomous driving, the result of the lane learned in step 122 described above is reflected in the lane characteristic value (step 126). Specifically, when it is learned that the driver prefers a travel lane, the lane characteristic value is corrected so that the probability of the travel lane being selected increases. Further, when it is learned that the driver prefers a passing lane, the lane characteristic value is corrected so that a selection probability of the passing lane increases. According to the above processing, the individual character of the autonomous driving vehicle 10 can be properly matched with the preference of the driver.

Further, an instruction value by the driver that has an influence on a vehicle behavior may be reflected in the lane characteristic value. As a first example of reflecting the instruction value set by the driver in the lane characteristic value, it is conceivable to set the lane characteristic value in accordance with a set speed of auto cruise. Auto cruise is a function of keeping the vehicle speed at a set speed of the driver. When the set vehicle speed is high, it is determined that the driver prefers high-speed cruising. In contrast, when the set vehicle speed is low, it can be determined that the driver prefers low-speed cruising. Consequently, the lane characteristic value may be reset so that as the set vehicle speed of auto cruise is higher, the high-speed lane is selected more easily. According to the example, in a left-hand traffic road in which a passing lane is at a right end, for example, a right side lane is selected more easily as the set speed of auto cruise is higher. Further, as the set speed is lower, a left side lane is selected more easily. As a result, the autonomous driving vehicle 10 exhibits the individual character which is matched with the preference of the driver.

As a second example of reflecting the instruction value which is set by the driver in the lane characteristic value, it is conceivable to set the lane characteristic value in accordance with a distance to a destination. When the distance to the destination is sufficiently long, a high cruise speed is preferred generally. On the other hand, when the distance to the destination is short, reducing the frequency of lane change is desired more than obtaining a high cruising speed. Consequently, the lane characteristic value may be set so that as the distance from a spot of starting travel to the destination is longer, a high-speed lane is selected more easily. According to the example, in the left-hand traffic road where the passing lane is at the right end, for example, the right side lane is selected more easily as the distance from the spot of starting travel to the destination is longer. Further, as the distance to the destination is shorter, the left side lane is selected more easily. As a result, in the case of long-distance travel, an individual character of high-speed cruise can be given to the autonomous driving vehicle 10. Further, in the case of short-distance travel, an individual character of traveling on the travel lane steadily can be given to the autonomous driving vehicle 10.

Incidentally, in the sixth embodiment and the modification example described above, a guard is not provided concerning change of the lane characteristic value. In that case, there can arise a situation in which the lane characteristic value changes greatly, and the individual character of the autonomous driving vehicle 10 abruptly changes. In order to avoid the abrupt change of the individual character like this, a guard may be provided in a change amount of the lane characteristic value which is allowed at one change.

Further, in the sixth embodiment and the modification example described above, the autonomous driving vehicle 10 holds only one lane characteristic value, but the single vehicle 10 may hold a plurality of lane characteristic values, with a plurality of users being assumed. In this case, the lane characteristic value may be reset for each of the users, in the same way as a seat position and the like.

Further, in the sixth embodiment and the modification example described above, the ECU 20 executes the same lane selection processing as in the case of the fourth embodiment (see, FIG. 10). However, the lane selection processing which the ECU 20 executes is not limited to the processing illustrated in FIG. 10. The processing may be changed to the lane selection processing in the fifth embodiment illustrated in FIG. 14, for example.

Seventh Embodiment

Next, a seventh embodiment of the present disclosure will be described with reference to FIGS. 20 and 21. The autonomous driving vehicle 10 of the present embodiment has the same hardware configuration as in the case of the first embodiment. Further, the autonomous driving vehicle 10 of the present embodiment determines vehicle distribution targets in a multiple-lane area, and determines a standard travel lane so that the distribution targets are realized, as in the case of the third embodiment (refer to FIGS. 7 and 8).

In the aforementioned third embodiment, the distribution target is set in accordance with the characteristics (the lane configuration and the road type) of the road. Then, even when the real vehicle distribution significantly deviates from the distribution targets, the autonomous driving vehicle 10 selects the standard travel lane in accordance with the distribution targets already determined. For example, when the real vehicle distribution is 80:20, in the travel road with the distribution targets of the first lane and the second lane being 60:40, it is necessary to increase the vehicles 10 that select the second lane, in order to achieve the distribution targets. However, according to the third embodiment, 60% of the autonomous driving vehicles 10 select the first lane even in the case like this, and there can arise a situation in which the real vehicle distribution further deviates from the distribution targets. The present embodiment has a feature in that in order to avoid inconvenience like this, correction is applied to the distribution targets in the individual autonomous driving vehicles 10 so that the real vehicle distribution is close to the distribution targets.

Figure 20:
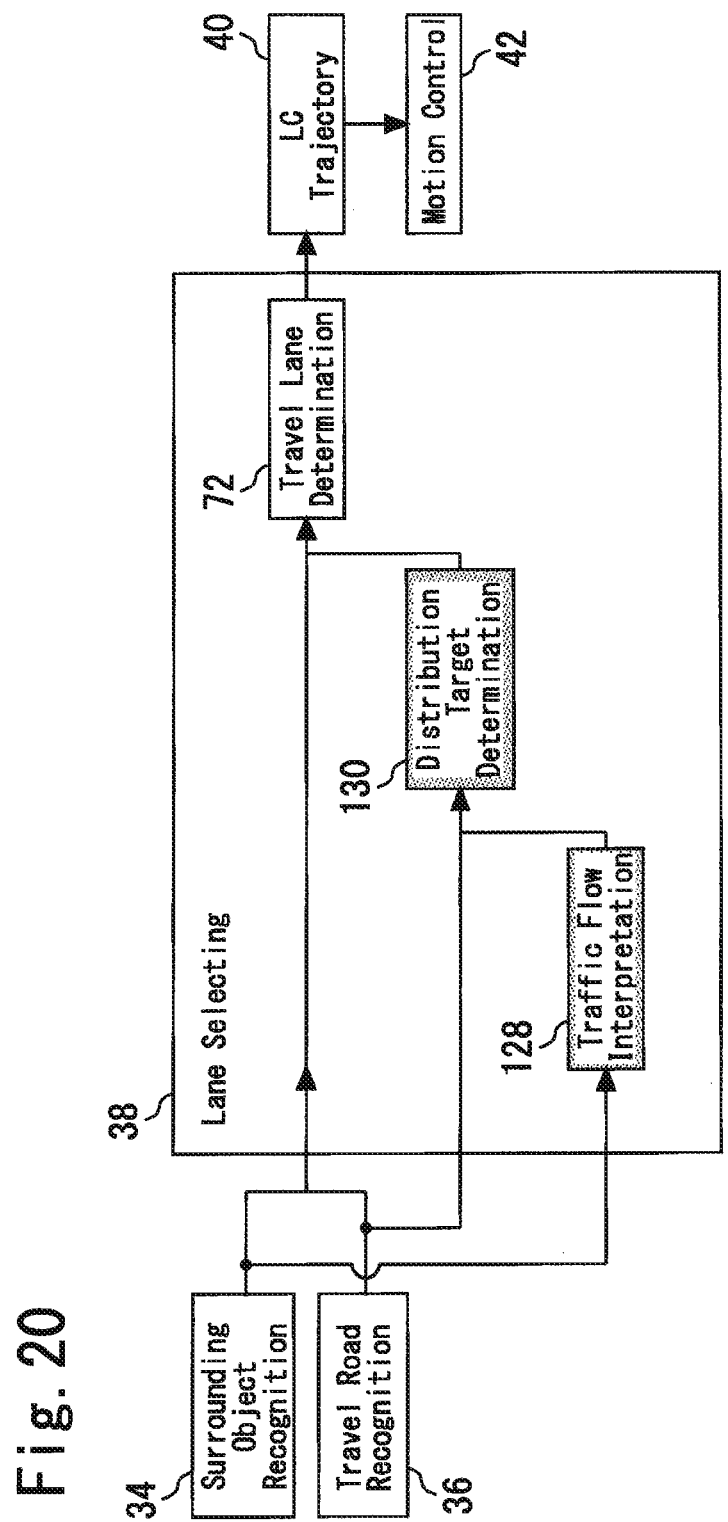
FIG. 20 is a block diagram showing a characteristic part of a seventh embodiment of the present disclosure.

FIG. 20 is a block diagram showing a characteristic part of the ECU 20 in the present embodiment. Hereinafter, in FIG. 20, the same elements as the elements illustrated in FIG. 7 will be assigned with common reference signs, and explanation thereof will be omitted or simplified.

In the present embodiment, the lane selecting section 38 includes a traffic flow interpretation section 128. The traffic flow interpretation section 128 detects a real vehicle distribution around the autonomous driving vehicle 10, based on information that is provided from the surrounding object recognition section 34 and the travel road recognition section 36.

The vehicle distribution detected by the traffic flow interpretation section 128 is provided to the distribution target determination section 130. The distribution target determination section 130 is realized by the ECU 20 performing distribution target determination processing. In the present embodiment, the distribution targets which are set in accordance with the characteristics of the road are corrected based on the real vehicle distribution by the distribution target determination processing. Then, the lane threshold values thri are set based on the corrected distribution targets in the individual autonomous driving vehicle 10.

Figure 21:
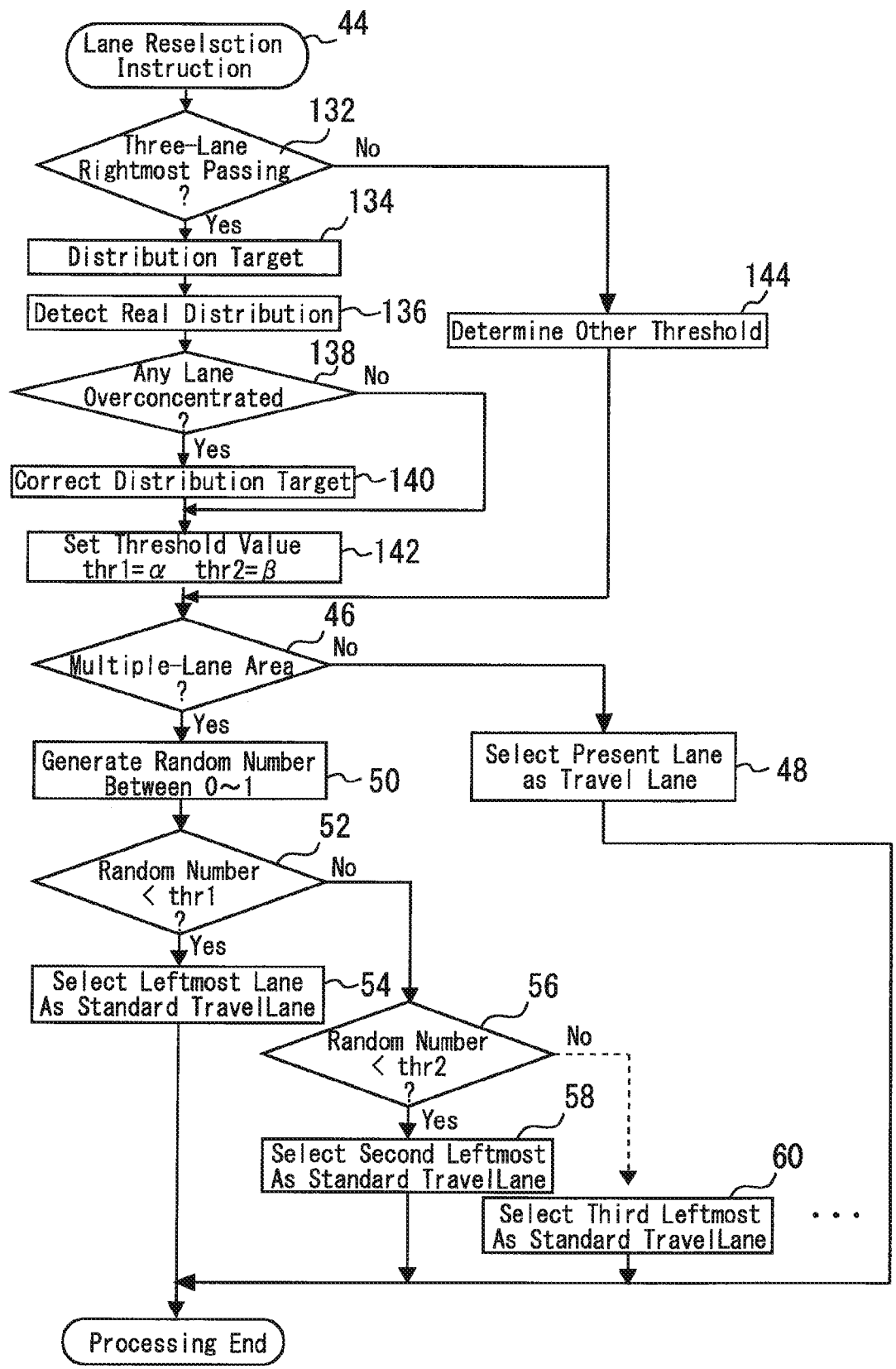
FIG. 21 is a flowchart for explaining the processing executed by the lane selecting section in the seventh embodiment of the present disclosure.

FIG. 21 is a flowchart of lane selection processing executed by the ECU 20 in the present embodiment. In addition to the distribution target determination processing (steps 132, 134, and 138 to 144) and traffic flow interpretation processing (step 136), the travel lane determination processing (steps 46 to 60) is included in a routine illustrated in FIG. 21. The travel lane determination processing is the same as in the case of the first embodiment (refer to FIG. 5), and therefore explanation will be omitted here.

The routine illustrated in FIG. 21 is started by the ECU 20 recognizing the lane reselection instruction similarly to the routine illustrated in FIG. 8 (step 44). When the routine is started, it is firstly determined whether the present travel road is a three-lane road, and the rightmost lane is a passing lane (step 132). When establishment of the condition is recognized, the vehicle distribution targets are determined for the respective lanes of the travel road (step 134). The processing of steps 132 and 134 are performed similarly to the processing in steps 76 and 78 illustrated in FIG. 8. Here, the distribution targets of the first lane, the second lane and the third lane are determined as 60%, 20% and 20%, for example, based on the characteristic of the travel road.

When the distribution targets are determined, the real vehicle distribution is detected next (step 136). Specifically, a vehicle density is firstly calculated for each of the lanes of the travel road, based on the information provided from the surrounding object recognition section 34. Next, by comparing the vehicle densities of the respective lanes, the vehicle distribution in the present travel road is calculated.

Next, it is determined whether or not the lane in which a vehicle distribution ratio exceeds the distribution target is present (step 138). When it is determined that the lane in which the distribution ratio exceeds the ratio of the distribution target is present, the distribution target is corrected so that the ratio of the lane is reduced (step 140). For example, when real vehicle distribution is 80:20:0 while distribution target is 60:20:20, a distribution target ratio of the first lane is reduced (from 60 to 40, for example), and a distribution target of the third lane is increased (from 20 to 40, for example). When it is determined that a lane in which the distribution ratio exceeds the distribution target is not present, the processing in step 140 is skipped, and the distribution targets which are set in step 134 described above is kept as it is.

When the above described processing is ended, the lane threshold values thri of the respective lanes are set in accordance with the distribution targets which are corrected or determined as not requiring correction next (step 142). For example, when the distribution target is corrected to 40:20:40, the lane threshold value thr1 of the first lane is set at 0.4, and the lane threshold value thr2 of the second lane is set at 0.6. In this case, the distribution ratio of only the autonomous driving vehicles 10 is 40:20:40, and the real vehicle distribution (80:20:0) is brought close to the distribution targets (60:20:20) of the travel road.

When the condition in step 132 described above is negated in the routine illustrated in FIG. 21, other threshold value setting processing is executed (step 144). Here, determination processing corresponding to step 132 is firstly executed by sequentially changing the condition, until the road condition corresponding to the present travel road is found. When the road condition corresponding to the present travel road is found, the distribution target and the lane threshold value thri that correspond to the road condition are set by the processing corresponding to steps 134 to 142.

According to the above processing, the distribution targets of the individual autonomous driving vehicles 10 are properly corrected when the real vehicle distribution deviates from the distribution targets, whereby the real vehicle distribution can be brought close to the basic distribution targets. Ultimately, in the traffic flow including non-autonomous driving vehicles, the authentic distribution targets of the travel road can be achieved.

[Modification Example of Seventh Embodiment]

In the aforementioned seventh embodiment, the ECU 20 sets the distribution targets of the travel road in the same process as in the case of the third embodiment (refer to steps 132 and 134). However, the setting may be advanced by the same process as in the case of the fifth embodiment. A desired function can be realized by inserting the processing from steps 136 to 140 illustrated in FIG. 21 to between steps 98 and 100, in the routine illustrated in FIG. 14, for example.

Further, in the aforementioned seventh embodiment, the real vehicle distribution is detected by the individual autonomous driving vehicles 10 based on the information and the like from the surrounding object recognition section 34. However, the vehicle distribution may be received from an infrastructure on the road by road-to-vehicle communication.

Alternatively, the autonomous driving vehicle 10 may have a communication system which receives the real vehicle distribution provided by a server which is set outside the vehicle. In this case, the ECU 20 may receive the vehicle distribution from the communication system. As a route of information transmission in this modification, two examples as follows are conceivable.

(1) Example of an infrastructure outside vehicle calculating the vehicle distribution The vehicle distribution is distributed by a route from the infrastructure outside vehicle to a server outside vehicle to the respective autonomous driving vehicles 10.

(2) Example of the server outside vehicle calculating the vehicle distribution

The respective autonomous driving vehicles 10 transmits their vehicle positions and/or around recognition information to the server outside vehicle.

The server outside vehicle collects the information and calculates the present vehicle distribution.

The vehicle distribution is distributed to the respective autonomous driving vehicles 10 from the server outside vehicle.

Eighth Embodiment

In the aforementioned third, fifth and seventh embodiments, the ECU 20 includes the distribution target determination sections 74, 90 and 130 (refer to FIGS. 7, 11 and 20). The distribution target determination sections 74, 90 and 130 set the distribution targets in accordance with the characteristics of the road, and make the individual autonomous driving vehicle 10 select the standard travel lanes so that the distribution targets are realized.

The distribution targets that are set in accordance with the characteristics of the road change before and after a spot where the characteristics of the road change. Specifically, in the third, fifth and seventh embodiments, the distribution targets of the travel road change before and after the spot where the number of lanes increases and decreases.

When the distribution targets of the individual vehicles 10 change at a specific spot simultaneously in the traffic flow including a number of autonomous driving vehicles 10, a number of autonomous driving vehicles 10 are to perform lane change at the spot simultaneously by following the change. The simultaneous change like this becomes a cause of confusing the traffic flow and is not preferable. The present embodiment has a feature in that, in order to avoid such confusion, a gradual changing area of the distribution targets is provided before and after the spot where the characteristics of the road change, and the distribution targets are gradually changed in the gradual changing area.

Hereunder, the eighth embodiment of the present disclosure will be described in detail with reference to FIGS. 22 and 23 together with FIG. 8. The autonomous driving vehicle 10 of the present embodiment can be realized by the same hardware configuration as in the case of the first embodiment.

Figure 22:
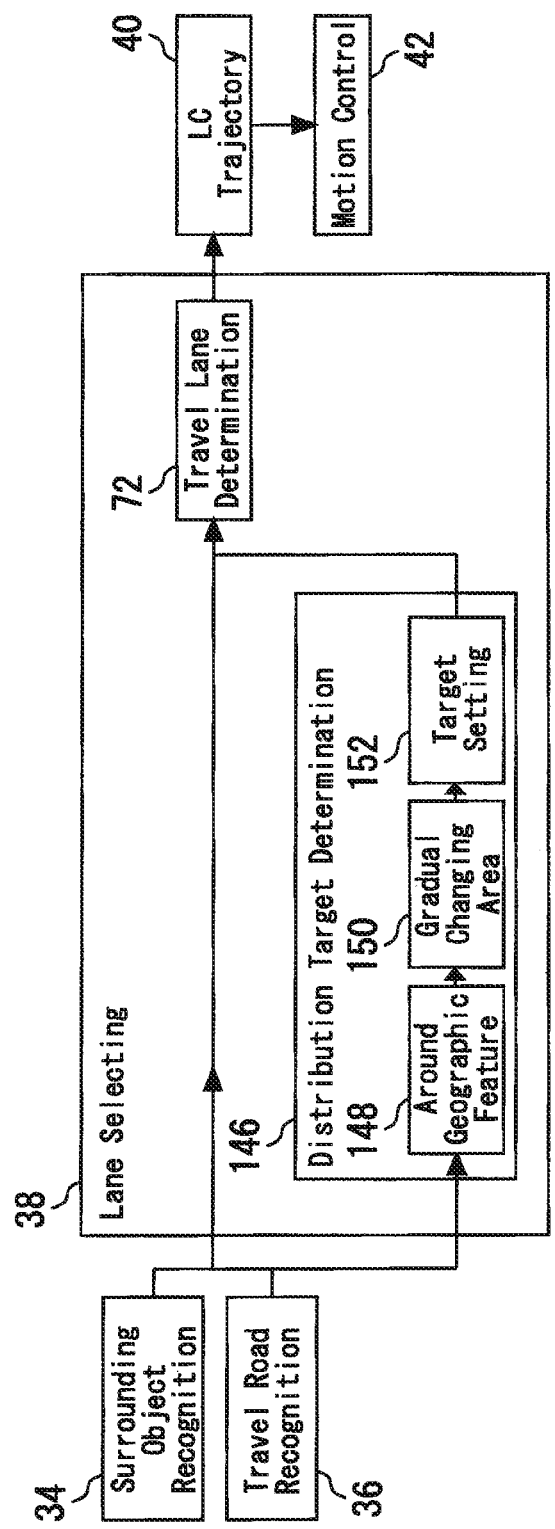
FIG. 22 is a block diagram showing a characteristic part of an eighth embodiment of the present disclosure.

FIG. 22 is a block diagram showing a characteristic part of the ECU 20 in the present embodiment. Note that in FIG. 2, the same or corresponding elements as or to the elements illustrated in FIG. 7 will be assigned with common reference signs and explanation will be omitted or simplified.

As illustrated in FIG. 22, in the present embodiment, the lane selecting section 38 includes a distribution target determination section 146 as well as the travel lane determination section 72. The distribution target determination section 146 further includes an around geographic feature interpretation section 148, a gradual changing area setting section 150 and a target setting section 152. The around geographic feature interpretation section 148 recognizes characteristics of the present travel road based on the information or the like from the travel road recognition section 36. The gradual changing area setting section 150 sets a gradual changing area for gradually changing the distribution targets in front and rear of a spot where the characteristics of the road change. The target setting section 152 performs processing of setting distribution targets that gradually change in the gradual changing area. These sections are all realized by the ECU 20 performing distribution target determination processing.

Figure 23:
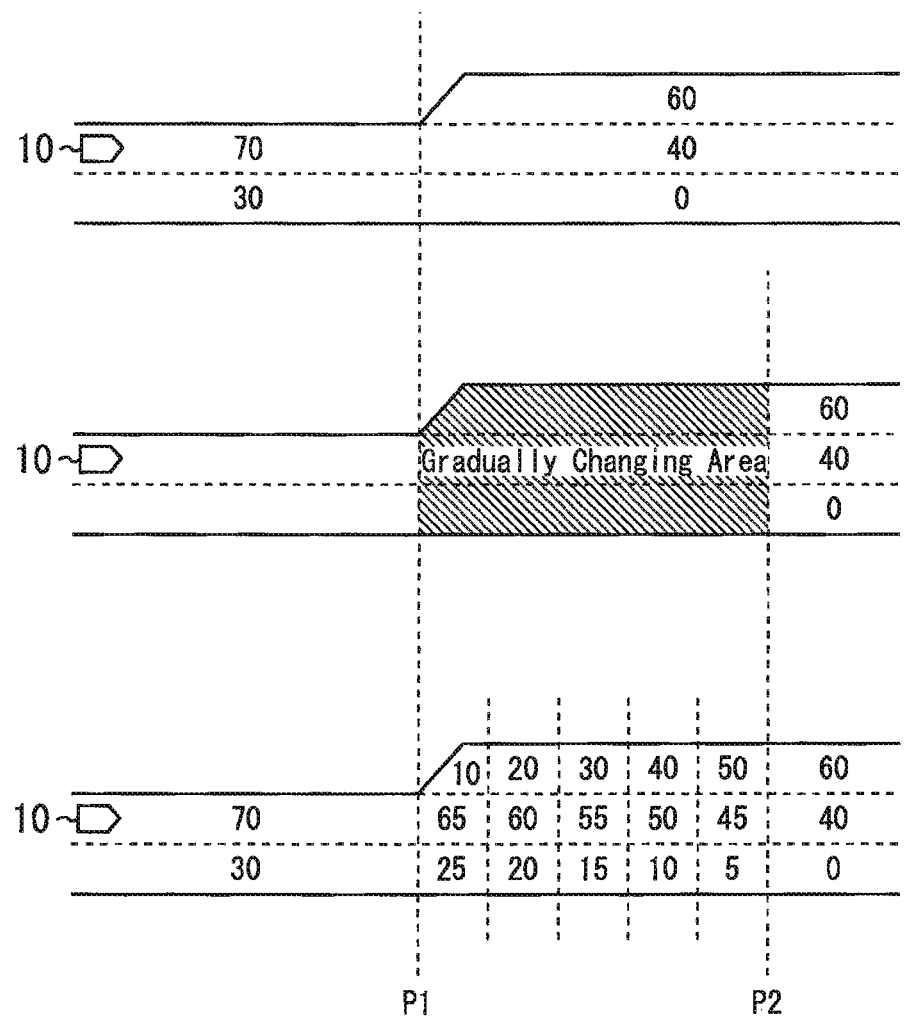
FIG. 23 shows schematically that distribution targets are gradually changed in a gradual changing area in the eighth embodiment of the present disclosure.

FIG. 23 is a diagram for explaining a content of a characteristic part of the distribution target determination processing in the present embodiment. The distribution target determination processing in the present embodiment is realized by the processing in steps 76 to 82 illustrated in FIG. 8. It should be noted that in step 78 in the present embodiment, processing that will be described as follows is executed.

An upper tier in FIG. 23 illustrates a basic distribution target of the travel road, which is set based on the characteristics of the travel road which are recognized by the around geographic feature interpretation section 148. Specifically, it illustrates a feature in which a two-lane road of the present changes to a three-lane road at a spot P1. Further, it is shown that distribution targets of a two-lane section is 70:30, and distribution targets of a three-lane section is 60:40:0.

A middle tier in FIG. 23 illustrates that a gradual changing area is set between the spot P1 and a spot P2. In a situation where the number of lanes will be increased, it is desirable that the basic distribution targets are kept until the number of lanes increases in reality. In order to avoid confusion in a traffic flow, lane change is desirably advanced gradually in accordance with a new lane environment from the spot P1 where the number of lanes increases. Consequently, in a case where lane number will be increased, the gradual changing area is provided after the spot P1 where the change occurs. On the other hand, in a case where a change of a lane decrease will occurs, it is desirable that the distribution of vehicles is gradually changed before the number of lanes decreases in reality for making preparation for an environment after the decrease. Consequently, in a case where the change of the lane decrease will occur, the gradual changing area is set before the change point.

The ECU 20 stores a relative position of the gradual changing area to the change point, and a length of the gradual changing area, in accordance with a kind of change that occurs to the characteristics of the road. In the gradual changing area setting section 150, the gradual changing area is set based on a memory of them.

A lower tier in FIG. 23 illustrates a state in which the distribution targets of 70:30 gradually change to 60:40:0 in the gradual changing area. The target setting section 152 fractionalizes the gradual changing area and sets the target numeral values so that the distribution targets that are set in front of the gradual changing area smoothly change to distribution targets that are set in the rear of the gradual changing area.

In step 78 in the routine illustrated in FIG. 8, the numeral values set by the target setting section 152 are determined as the distribution targets. In step 80, the lane threshold values thr1 and thr2 are set in accordance with the distribution targets. In this case, the lane threshold values thr1 and thr2 gradually change in the gradual changing area, and the distribution of the autonomous driving vehicles 10 gradually change before and after the change point.

As described above, according to the present embodiment, the distribution targets of the autonomous driving vehicle 10 can be gradually changed to new distribution targets before and after the change point on the road. When the distribution targets of the autonomous driving vehicles 10 gradually change, lane change is not performed simultaneously in the change point. Consequently, according to the present embodiment, a smooth traffic flow can be kept even when a number of autonomous driving vehicles pass through the change point.

[Modification Example of Eighth Embodiment]

In the aforementioned eighth embodiment, lane change is permitted among any lanes in the gradual changing area of the distribution targets. However, a limit may be put on the lanes where lane change is permitted in the gradual changing area. For example, in a section from the change point to a point of 300 m away, only lane change from the second lane to the first lane may be permitted, and in a section from to point of 300 m to a point of 600 m away, only lane change from the third lane to the second lane may be permitted. When a limit like this is put on lane change, an entering vehicle and exiting vehicle do not interfere with each other, and confusion in a traffic flow can be effectively prevented.

Ninth Embodiment

Next, a ninth embodiment of the present disclosure will be described with reference to FIGS. 24 to 26. The autonomous driving vehicle 10 of the present embodiment can be realized by the same hardware configuration as in the case of the first embodiment.

Figure 24:
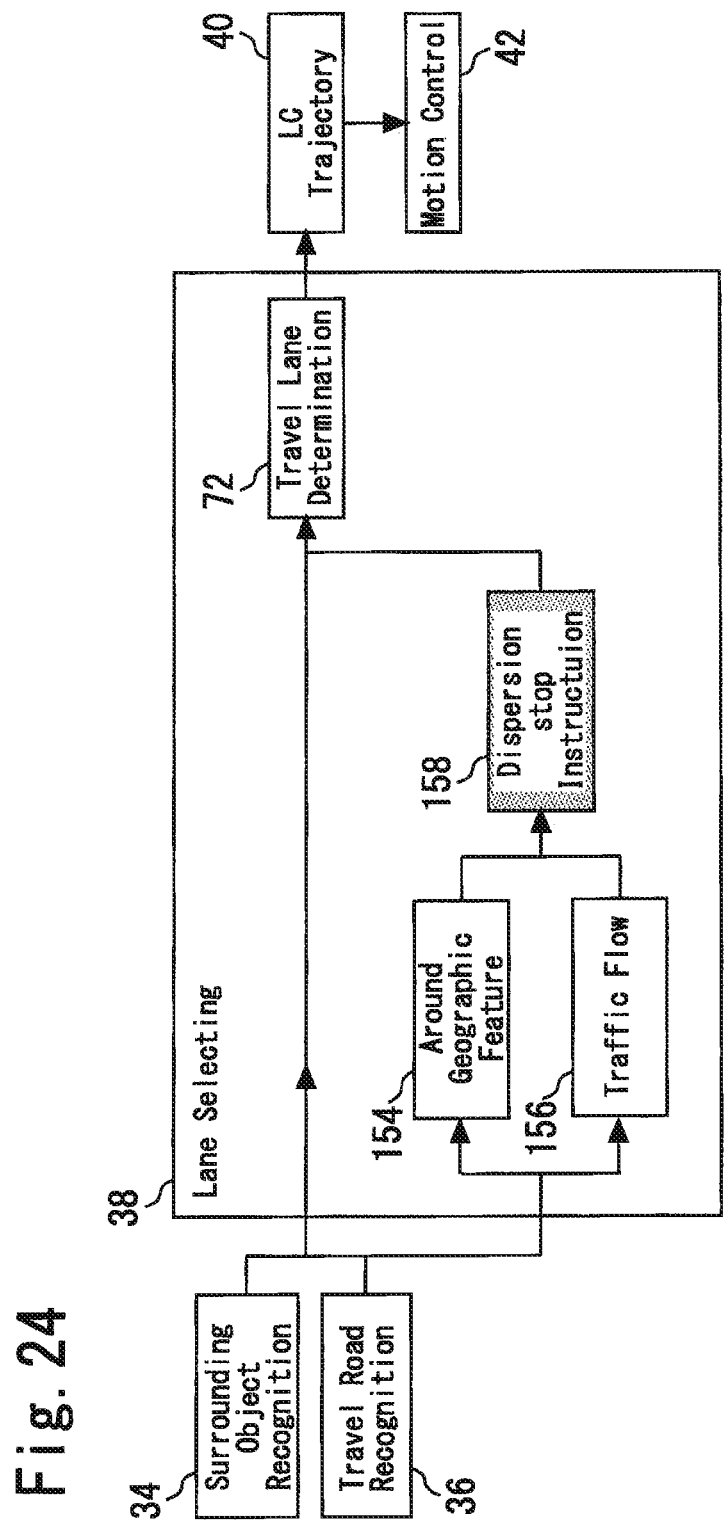
FIG. 24 is a block diagram showing a characteristic part of a ninth embodiment of the present disclosure.

FIG. 24 is a block diagram showing a characteristic part of the ECU 20 in the present embodiment. Note that in FIG. 24, the same or corresponding elements as or to the elements illustrated in FIG. 7 will be assigned with common reference signs, and explanation thereof will be omitted or simplified.

As illustrated in FIG. 24, in the present embodiment, the lane selecting section 38 includes an around geographic feature interpretation section 154, a traffic flow interpretation section 156 and a dispersion stop instruction section 158 as well as the travel lane determination section 72. The around geographic feature interpretation section 154 detects a situation of a present travel road of the autonomous driving vehicle 10 based on the information and the like from the travel road recognition section 36. Further, the traffic flow interpretation section 156 detects how vehicles are traveling in an environment surrounding the autonomous driving vehicle 10 based on the information and the like from the surrounding object recognition section 34.

The dispersion stop instruction section 158 determines whether or not a no-change recommendation phenomenon occurs around the autonomous driving vehicle 10 based on a detection result of the around geographic feature interpretation section 154, and a detection result of the traffic flow interpretation section 156. The no-change recommendation phenomenon is a phenomenon in which a most suitable lane determined from the around situation of the autonomous driving vehicle 10 should be selected as a travel lane, without considering necessity of dispersion. Upon recognizing a no-change recommendation phenomenon like this, the dispersion stop instruction section 158 generates an instruction to stop the determination processing of the standard travel lane in the mode where dispersion occurs.

Figure 25:
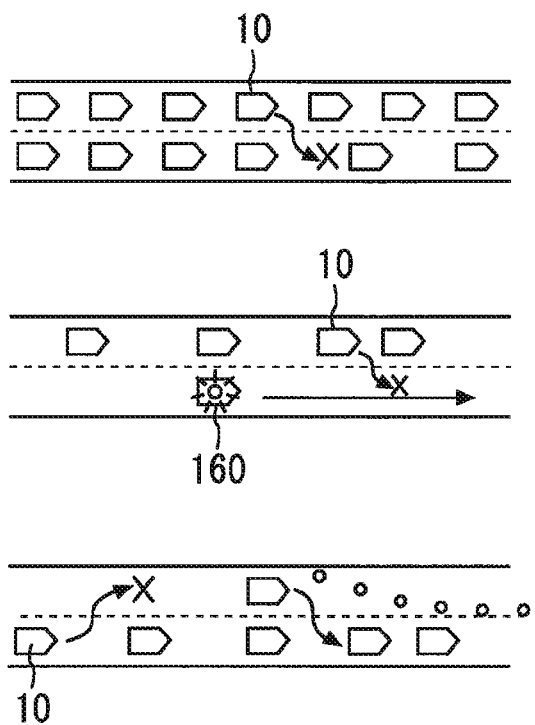
FIG. 25 is a diagram for explaining an example of no-change recommendation phenomenon under which lane keeping is recommended to an autonomous driving vehicle in the ninth embodiment of the present disclosure.

FIG. 25 is a diagram for explaining a typical example of the aforementioned no-change recommendation phenomenon. An upper tier in FIG. 25 illustrates a state where the autonomous driving vehicle 10 is traveling in a line of vehicles in traffic congestion. When an individual vehicle indiscreetly performs lane change in congestion, the traffic flow further stagnates. Consequently, when detecting congestion, the dispersion stop instruction section 158 determines that the no-change recommendation phenomenon occurs, and generates the above described stop instruction. Occurrence of the congestion can be detected based on the density of other vehicles existing around in the travel lane and the adjacent lanes, the average speed of the own vehicle and the like.

Note that it may be determined whether or not congestion occurs based on information that is provided from an infrastructure side by road-to-vehicle communication. Alternatively, the autonomous driving vehicle 10 may have a communication system which receives the occurrence of congestion provided by a server which is set outside the vehicle. In this case, the ECU 20 may receive the occurrence of congestion from the communication system. As a route of information transmission in this case, two examples as follows are conceivable, for example.

(1) Example of the infrastructure outside vehicle determining occurrence of congestion Congestion occurrence information is distributed via the route from the infrastructure outside vehicle to the server outside vehicle to the respective autonomous driving vehicles 10.

(2) Example of the server outside vehicle determining occurrence of congestion

The respective autonomous driving vehicles 10 transmit their vehicle positions and/or around recognition information to the server outside the vehicles.

The server outside the vehicles integrates information and determines presence or absence of congestion.

The congestion occurrence information is distributed to the respective autonomous driving vehicles 10 from the server outside the vehicles.

A middle tier in FIG. 25 illustrates a state in which an emergency vehicle 160 travels at a high speed on a passing lane, when the autonomous driving vehicle 10 travels on the travel lane. In such a case, it is desirable that lane change which interferes with passage of the emergency vehicle 160 is not performed. Therefore, when detecting approach of the emergency vehicle 160, the dispersion stop instruction section 158 determines that a no-change recommendation phenomenon occurs, and generates the above described stop instruction. Approach of the emergency vehicle 160 can be detected based on sound and light emitted by the emergency vehicle 160, a relative speed of the approaching vehicle and the vehicle itself and the like. However, approach of the emergency vehicle also may be determined based on information that is provided by the road-to-vehicle communication.

A situation that is analogous to the situation illustrated in the middle tier in FIG. 25 also occurs when a high-speed vehicle is traveling on the passing lane. In such a case, from the viewpoint of keeping a smooth traffic flow, it is desirable not to hinder travel of the high-speed vehicle. Consequently, the dispersion stop instruction section 158 also determines a no-change recommendation phenomenon occurs and generates the above described stop instruction when recognizing an approaching vehicle the relative speed of which is extremely high on the passing lane.

A lower tier in FIG. 25 illustrates a situation where the autonomous driving vehicle 10 is on a verge of a construction section in the first lane of the travel road. Under the situation like this, vehicles gather on the second lane, so that the distribution of the vehicles is imbalanced. However, under the situation like this, from the viewpoint of keeping a smooth traffic flow, the autonomous driving vehicle 10 does not have to be allowed to select the first lane. Consequently, when detecting the construction section, the dispersion stop instruction section 158 also determines that a no-change recommendation phenomenon occurs and generates the above described stop instruction. Occurrence of a construction section can be detected by recognizing road cones (pylons) that are arranged on the road, a sign board indicating lane restrictions and the like.

A situation analogous to the situation illustrated on the lower tier in FIG. 25 also occurs in such a case where a fallen object is present on the road, for example. In that case, a number of vehicles perform lane change to the other lanes from the lane where the fallen object is present, and thereby an imbalance occurs to the traffic flow. However, in that case, the autonomous driving vehicle 10 should not allow to select a vacant lane, either. Consequently, when a number of vehicles perform lane change to the other lanes from a specific lane, the dispersion stop instruction section 158 also determines that the no-change recommendation phenomenon occurs and generates the above described stop instruction. The lane change of preceding vehicles can be detected based on actuation of direction indicators, and trajectory changes of the preceding vehicles, for example.

Figure 26:
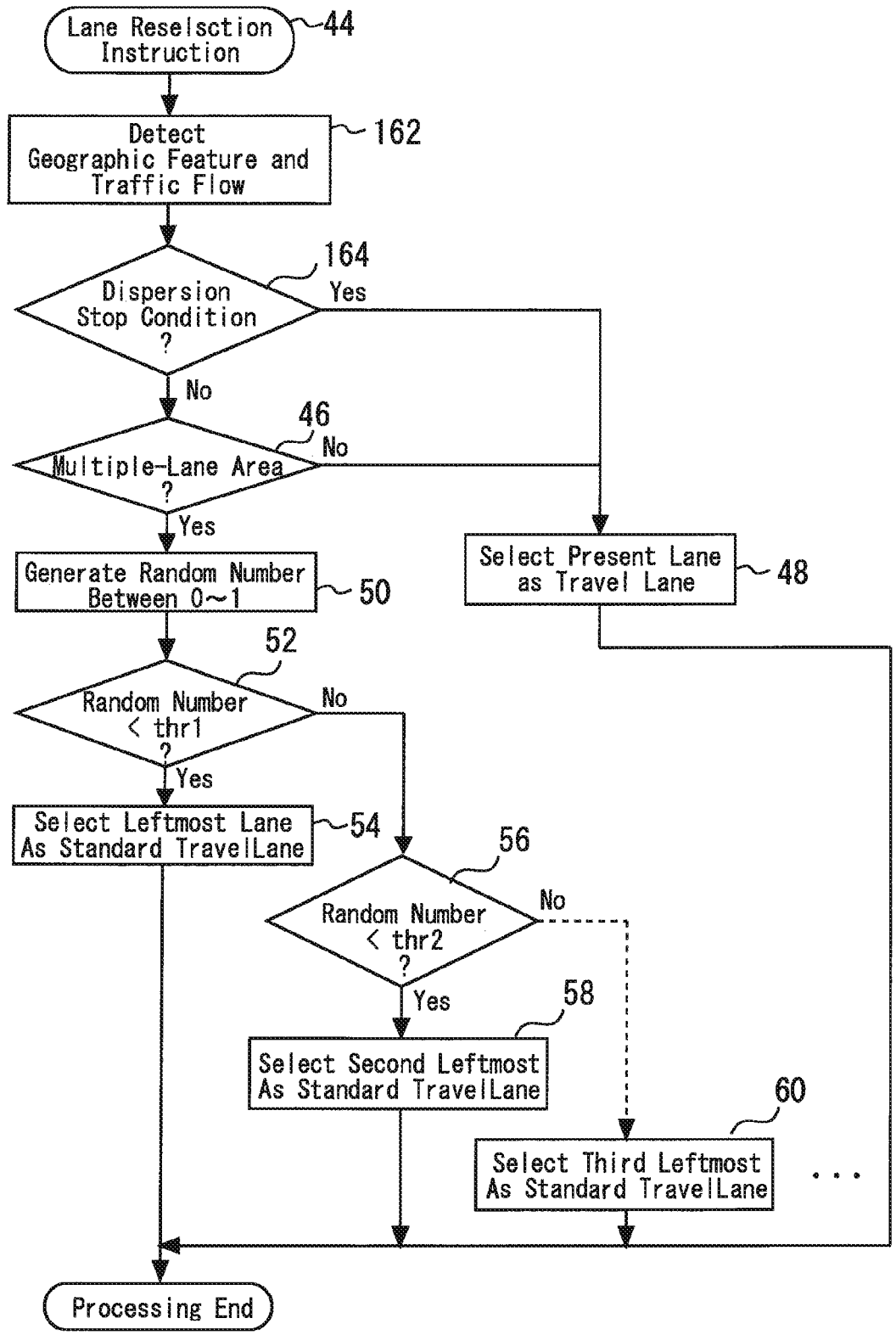
FIG. 26 is a flowchart for explaining the processing executed by the lane selecting section in the ninth embodiment of the present disclosure.

FIG. 26 is a flow chart of lane selection processing executed by the ECU 20 in the present embodiment. A routine illustrated in FIG. 26 includes the travel lane determination processing (steps 46 to 60) in addition to processing of detecting an around geographic feature and a traffic flow (step 162) and processing of determining occurrence of the dispersion stop instruction (step 164). The travel lane determination processing is the same as in the case of the first embodiment (refer to FIG. 5), and therefore explanation will be omitted here.

The routine illustrated in FIG. 26 is started by the ECU 20 recognizing the lane reselection instruction as in the routine illustrated in FIG. 5 (step 44). When the routine is started, the around geographic feature/traffic flow detection processing is firstly executed (step 162). Specifically, based on various kinds of information that are provided from the around object recognition section 34 and the travel road recognition section 36, a present situation of the travel road, and a situation of the other vehicles existing around are detected.

Next, it is determined whether or not a condition in which the dispersion stop instruction should arise occurs (step 164). Specifically, based on the detection result of step 162 described above, it is determined whether or not any of the following no-change recommendation phenomena is established.

(1) Traffic congestion
(2) Passage of urgent vehicle
(3) Passage of high-speed vehicle
(4) Occurrence of construction section
(5) Lane change by a number of vehicles from specific lane to other lanes When none of the no-change recommendation phenomena is recognized in step 164, the standard travel lane is thereafter determined as in the case of the first embodiment by the processing of step 46 and the following steps. In this case, dispersion occurs in the standard travel lanes in the traffic flow which a number of autonomous driving vehicles 10 join, and occurrence of an imbalanced traffic flow is avoided.

When occurrence of any of the no-change recommendation phenomena is recognized in step 164 described above, the present lane is selected as the travel lane in step 48. The autonomous driving vehicle 10 has the function of selecting an optimal lane corresponding to the situation of the present travel road and the situation of the other vehicles existing around in the other routine. In this step, the lane which is determined by the function is selected as the travel lane. In this case, a number of autonomous driving vehicles 10 which are placed under the same situation select the same lane as the travel lanes. Under the situation where the no-change recommendation phenomena occur, it is desirable for keeping the traffic flow smooth that a number of autonomous driving vehicles 10 select the optimal lane without dispersion. According to the above described processing, the request can be satisfied.

As described above, according to the present embodiment, under the situation in which the individual autonomous driving vehicles 10 should not perform lane change independently, the processing of determining the standard travel lane in a mode in which dispersion occurs can be stopped. Consequently, according to the present embodiment, the traffic flow can be kept smooth even under the situation like this.

Incidentally, in the aforementioned ninth embodiment, the function of generating a dispersion stop instruction is combined with the processing of the first embodiment, but the combination is not limited to this. That is, the function of generating the dispersion stop instruction may be combined with any of the aforementioned first to eighth embodiments.

What is claimed is:

1. An autonomous driving system including a plurality of autonomous driving vehicles,
   wherein each of the autonomous driving vehicles comprises
   a control device that sets a travelable area in which the autonomous driving vehicle can travel in a process of going to a destination, and determines one lane as a standard travel lane in a multiple-lane area including two or more lanes in the travelable area, and
   the control devices installed in the individual autonomous driving vehicles are configured so that dispersion of the plurality of autonomous driving vehicles occurs to the standard travel lanes which the plurality of autonomous driving vehicles determine in a same multiple-lane area placed under a same environment,
   wherein the control device stores a lane characteristic value, and determines the standard travel lane based on the lane characteristic value,
   wherein lane characteristic values stored in the respective plurality of autonomous driving vehicles have dispersion, and
   wherein the control device executes:
   processing of generating random numbers,
   processing of reading lane threshold values, and
   lane determination processing of determining the standard travel lane based on comparison of the random numbers and the lane threshold values.

2. The autonomous driving system according to claim 1, wherein the lane determination processing comprises
   processing of determining a temporary travel lane in the multiple-lane area based on information concerning travel of the vehicle, and
   processing of determining whether to set the temporary travel lane as the standard travel lane, or to set a lane different from the temporary travel lane as the standard travel lane, based on comparison of the random numbers and the lane threshold values.

3. The autonomous driving system according to claim 1, wherein the control device executes
   processing of setting vehicle distribution targets in the multiple-lane area, and
   processing of setting the lane threshold values in correspondence with the distribution targets.

4. The autonomous driving system according to claim 3, wherein the control device executes
   processing of acquiring real vehicle distribution in the multiple-lane area, and
   processing of correcting the lane threshold values so that the real vehicle distribution approaches the distribution targets.

5. The autonomous driving system according to claim 3, wherein the control device executes
   processing of extracting a change point where the distribution targets change on a route to the destination,
   processing of setting one section in a multiple-lane area including the change point as a gradual changing area, and
   processing of gradually changing the distribution targets in the gradual changing area from a distribution before the change to a distribution after the change.

6. The autonomous driving system according to claim 1, wherein the control device executes
   threshold value setting processing of setting lane threshold values based on the lane characteristic value.

7. The autonomous driving system according to claim 6, wherein the control device executes
   processing of setting vehicle distribution targets in the multiple-lane area, and
   processing of setting such a relation between the lane characteristic value and the lane threshold value that the distribution targets are realized when the lane characteristic value is dispersed in an entire range of a variation region, and
   setting the lane threshold values by applying a lane characteristic value of an own vehicle to the relation, in the threshold value setting processing.

8. The autonomous driving system according to claim 1, wherein the control device executes
   threshold value setting processing of setting lane threshold values that are used in common in the plurality of autonomous driving vehicles, and
   processing of determining the standard travel lane based on comparison of the lane threshold values and the lane characteristic value.

9. The autonomous driving system according to claim 8, wherein
   the control device executes processing of setting vehicle distribution targets in the multiple-lane area, and
   the threshold value setting processing includes processing of setting the lane threshold values in correspondence with the distribution targets.

10. The autonomous driving system according to claim 1, wherein the control device executes
    processing of detecting a characteristic concerning lane selection of a driver of a vehicle, and processing of reflecting the characteristic in the lane characteristic value.

11. The autonomous driving system according to claim 1, wherein the control device executes
processing of detecting an no-change recommendation phenomenon in which keep of a lane is recommended, and
processing of determining the standard travel lane in a mode that causes the plurality of autonomous driving vehicles placed under a same environment to make a same decision when the no-change recommendation phenomenon is detected.

12. An autonomous driving vehicle having a function of performing autonomous travel toward a destination, comprising:
a control device that sets a travelable area in which the autonomous driving vehicle can travel in a process of going to the destination, and determines one lane as a standard travel lane in a multiple-lane area including two or more lanes in the travelable area,
wherein the control device is configured so that dispersion occurs to the standard travel lane that is determined in a same multiple-lane area placed under a same environment,
wherein the control device stores a lane characteristic value, and determines the standard travel lane based on the lane characteristic value,
wherein lane characteristic values stored in a respective plurality of autonomous driving vehicles have dispersion, and
wherein the control device executes
processing of generating random numbers,
threshold value setting processing of setting lane threshold values based on the lane characteristic value,
processing of reading lane threshold values, and
lane determination processing of determining the standard travel lane based on comparison of the random numbers and the lane threshold values.

13. The autonomous driving vehicle according to claim 12, wherein the lane determination processing comprises
processing of determining a temporary travel lane in the multiple-lane area based on information concerning travel of the vehicle, and
processing of determining whether to set the temporary travel lane as the standard travel lane, or to set a lane different from the temporary travel lane as the standard travel lane, based on comparison of the random numbers and the lane threshold values.

14. The autonomous driving vehicle according to claim 12, wherein the control device executes
processing of setting vehicle distribution targets in the multiple-lane area, and
processing of setting the lane threshold values in correspondence with the distribution targets.

15. The autonomous driving system according to claim 14, wherein the control device executes
processing of acquiring real vehicle distribution in the multiple-lane area, and
processing of correcting the lane threshold values so that the real vehicle distribution approaches the distribution targets.

16. The autonomous driving vehicle according to claim 14, wherein the control device executes
processing of extracting a change point where the distribution targets change on a route to the destination,
processing of setting one section in a multiple-lane area including the change point as a gradual changing area, and
processing of gradually changing the distribution targets in the gradual changing area from a distribution before the change to a distribution after the change.

17. The autonomous driving vehicle according to claim 12, wherein the control device executes
processing of detecting an no-change recommendation phenomenon in which keep of a lane is recommended, and
processing of determining the standard travel lane in a mode in which same decision is made under a same environment when the no-change recommendation phenomenon is detected.

18. An autonomous driving vehicle having a function of performing autonomous travel toward a destination, comprising:
a control device that sets a travelable area in which the autonomous driving vehicle can travel in a process of going to the destination, and determines one lane as a standard travel lane in a multiple-lane area including two or more lanes in the travelable area,
wherein the control device is configured so that a probability of each of individual lanes being determined as the standard travel lane in a same multiple-lane area placed under a same environment becomes a fixed value except for 100% for each of the lanes,
wherein the control device stores a lane characteristic value, and determines the standard travel lane based on the lane characteristic value,
wherein lane characteristic values stored in a respective plurality of autonomous driving vehicles have dispersion, and
wherein the control device executes:
processing of generating random numbers,
threshold value setting processing of setting lane threshold values based on the lane characteristic value, and
processing of determining the standard travel lane based on comparison of the random numbers and the lane threshold values.

19. The autonomous driving vehicle according to claim 18, wherein the control device executes
processing of setting vehicle distribution targets in the multiple-lane area, and
processing of setting such a relation between the lane characteristic value and the lane threshold values that the distribution targets are realized when the lane characteristic value disperses in an entire range of a variation region, and
sets the lane threshold values by applying a lane characteristic value of a vehicle to the relation, in the threshold value setting processing.

20. The autonomous driving vehicle according to claim 18, wherein the control device
executes
threshold value setting processing of setting lane threshold values corresponding to the respective lanes of the multiple-lane area, and
processing of determining the standard travel lane based on comparison of the lane threshold values and the lane characteristic value.

21. The autonomous driving vehicle according to claim 20, wherein
the control device executes processing of setting vehicle distribution targets in the multiple-lane area, and the threshold value setting processing includes processing of setting the lane threshold value in correspondence with the distribution targets.

22. The autonomous driving vehicle according to claim 18, wherein the control device executes
processing of detecting a characteristic concerning lane selection of a driver of an own vehicle, and
processing of reflecting the characteristic in the lane characteristic value.

* * * * *

UNITED STATES PATENT AND TRADEMARK OFFICE
CERTIFICATE OF CORRECTION

PATENT NO. : 10,699,579 B2  
APPLICATION NO. : 15/644136  
DATED : June 30, 2020  
INVENTOR(S) : Ryuta Hashimoto et al.

Page 1 of 1

It is certified that error appears in the above-identified patent and that said Letters Patent is hereby corrected as shown below:

On the Title Page

Item (72), inventor 1, city, delete "Susono" and insert --Susono-shi Shizuoka-ken--, therefor.

Item (72), inventor 2, city, delete "Gotenba" and insert --Gotenba-shi Shizuoka-ken--, therefor.

Item (72), inventor 3, city, delete "Miyoshi" and insert --Miyoshi-shi Aichi-ken--, therefor.

Item (72), inventor 4, city, delete "Hadano" and insert --Hadano-shi Kanagawa-ken--, therefor.

Signed and Sealed this  
Twentieth Day of April, 2021

Drew Hirshfeld  
*Performing the Functions and Duties of the  
Under Secretary of Commerce for Intellectual Property and  
Director of the United States Patent and Trademark Office*